(12) United States Patent
Richardson et al.

(10) Patent No.: US 7,566,493 B2
(45) Date of Patent: Jul. 28, 2009

(54) COATING COMPOSITION

(75) Inventors: Alexander Stewart Richardson, Hunters Hill (AU); John Andrew Smyth, Picton (AU)

(73) Assignees: Worldwide Coatings IP Pty Ltd, Picton NSW (AU); Worldwide Fire Retardant IP Pty Ltd, Picton NSW (AU); Worldwide Thermal Management IP Pty Ltd, Picton NSW (AU)

(*) Notice: Subject to any disclaimer, the term of this patent is extended or adjusted under 35 U.S.C. 154(b) by 539 days.

(21) Appl. No.: 10/257,850

(22) PCT Filed: Apr. 20, 2001

(86) PCT No.: PCT/AU01/00457

§ 371 (c)(1),
(2), (4) Date: Nov. 19, 2002

(87) PCT Pub. No.: WO01/81482

PCT Pub. Date: Nov. 1, 2001

(65) Prior Publication Data

US 2003/0145762 A1 Aug. 7, 2003

(30) Foreign Application Priority Data

Apr. 20, 2000 (AU) .................... PQ7079

(51) Int. Cl.
*B32B 5/16* (2006.01)
*B32B 27/00* (2006.01)

(52) U.S. Cl. .............. 428/323; 428/326; 428/340; 428/341; 428/342

(58) Field of Classification Search ........ 428/323, 428/326, 340, 341, 342
See application file for complete search history.

(56) References Cited

U.S. PATENT DOCUMENTS

| | | | |
|---|---|---|---|
| 4,089,994 A | 5/1978 | Mattsson et al. | |
| 4,155,887 A | 5/1979 | Hetson | |
| 4,226,982 A | 10/1980 | Blount | |
| 4,480,053 A | 10/1984 | Sherno | |
| 4,751,141 A * | 6/1988 | Fink et al. | ............... 428/326 |
| 4,791,020 A * | 12/1988 | Kokta | ............... 428/326 |
| 5,055,513 A | 10/1991 | Banford et al. | |
| 5,106,888 A | 4/1992 | Kosinski | |
| 5,269,470 A | 12/1993 | Ishikawa et al. | |
| 5,298,076 A | 3/1994 | Babler | |
| 5,321,063 A | 6/1994 | Shimada et al. | |
| 5,989,328 A | 11/1999 | Stahovic et al. | |
| 6,037,380 A * | 3/2000 | Venables et al. | ............ 514/781 |
| 6,326,323 B1 * | 12/2001 | Shimano et al. | .......... 428/32.16 |

FOREIGN PATENT DOCUMENTS

| | | |
|---|---|---|
| AU | 8884391 | 6/1992 |
| AU | 1048792 | 8/1992 |
| AU | 3152493 | 7/1993 |
| AU | 7764294 | 5/1995 |
| AU | 5331896 | 11/1996 |
| CA | 1042413 | 11/1978 |
| CA | 1042413 A | 11/1978 |
| HU | P9802610 | 3/1999 |
| JP | 1254782 | 10/1989 |
| JP | 4139277 | 5/1992 |
| JP | 4353574 | 12/1992 |
| JP | 5163445 | 6/1993 |
| JP | 05163445 A | 6/1993 |
| JP | 6041475 | 2/1994 |
| JP | 6136693 | 5/1994 |
| JP | 2000063700 A | 2/2000 |
| RU | 2139310 | 10/1999 |
| WO | 86/05195 A1 | 9/1986 |

OTHER PUBLICATIONS

Maine F., "Wood-Plastic Composites—Challenges and Opportunities", Mar. 2004, PSA Composites, Inc. 40 Taggart Street, Unite 3 & 4, Guelph, Ontario N1H 6H8 Canada.

Maldas, D. et al., "Use of Wood Fibres as Reinforcing Fillers for Polystyrene", Dec. 4, 1987, Material Science and Engineering, A104 (1988) 235-244.

\* cited by examiner

*Primary Examiner*—Sheeba Ahmed
(74) *Attorney, Agent, or Firm*—Ladas & Parry LLP

(57) ABSTRACT

The invention relates to a coating composition comprising (i) a supporting medium, and (ii) a plurality of cellulose particles, having an average dry particle size of less than 10 μm, dispersed in the supporting medium, excluding aqueous coating compositions adapted for application to paper. The invention also relates to a coating composition comprising (i) a supporting medium, and (ii) a plurality of cellulose particles, having an average dry particle size of less than 10 μm, dispersed in the supporting medium in an amount of less than about 5 g/L. The coating compositions of the invention form coatings which have useful thermal properties.

9 Claims, 20 Drawing Sheets

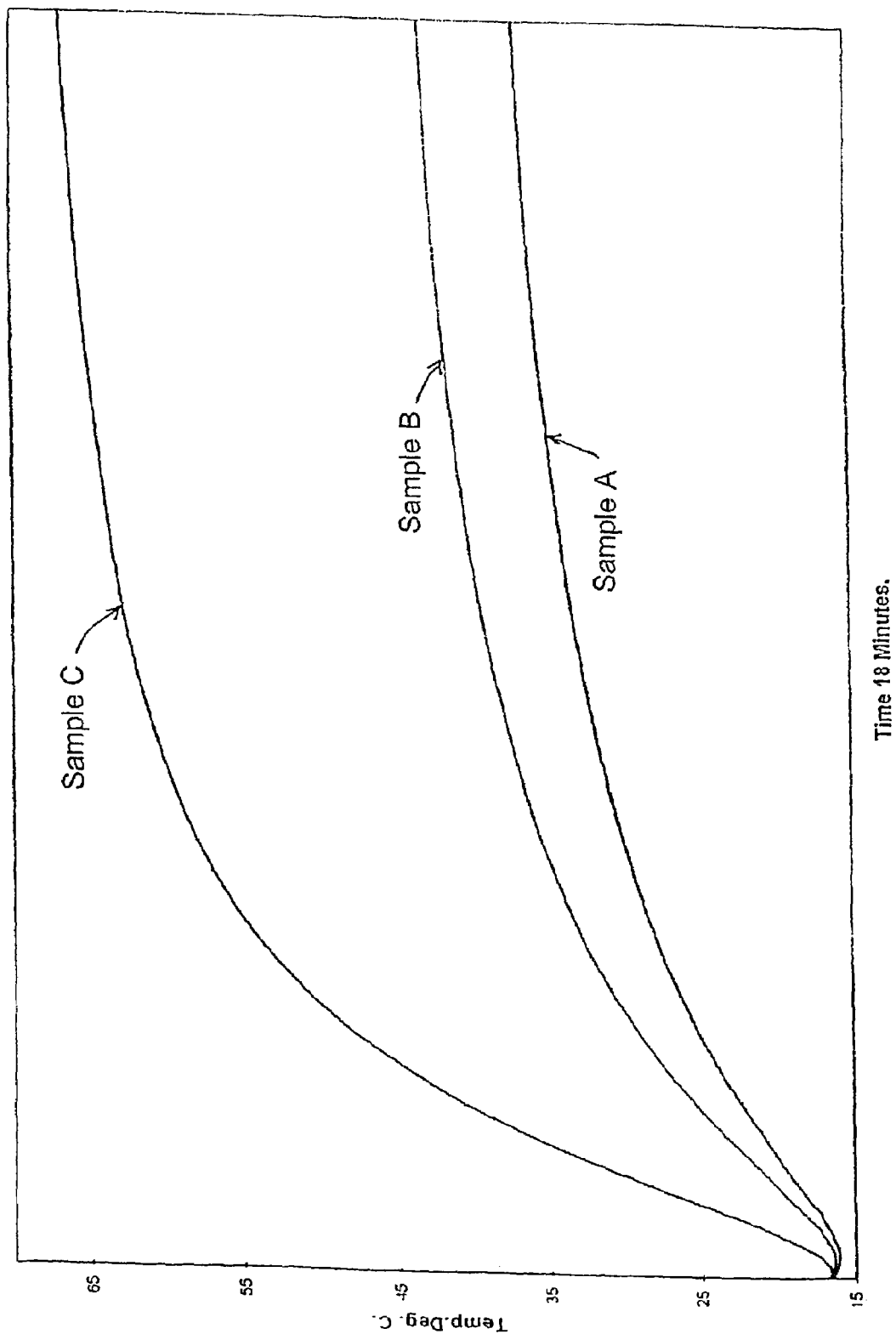

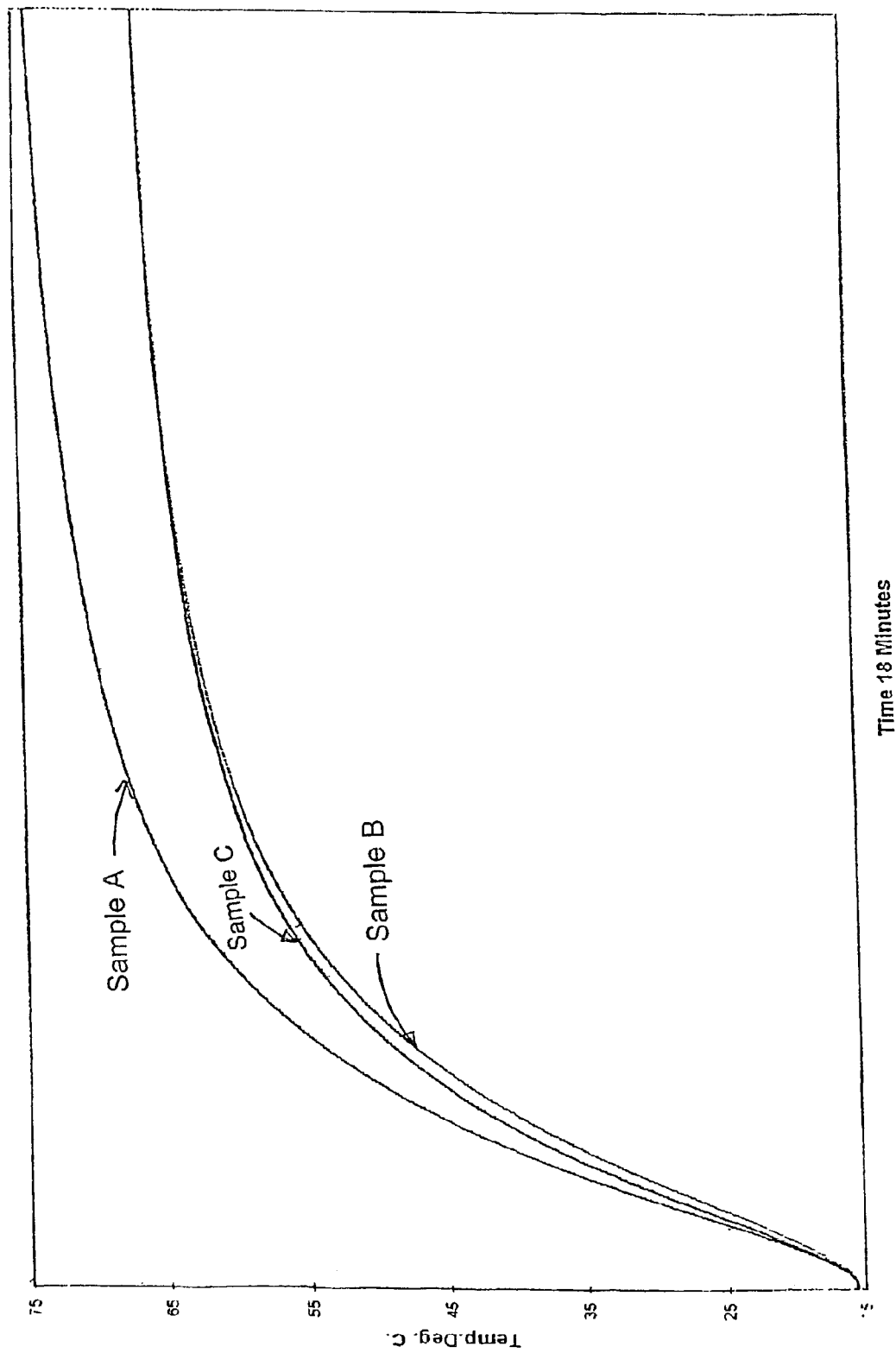

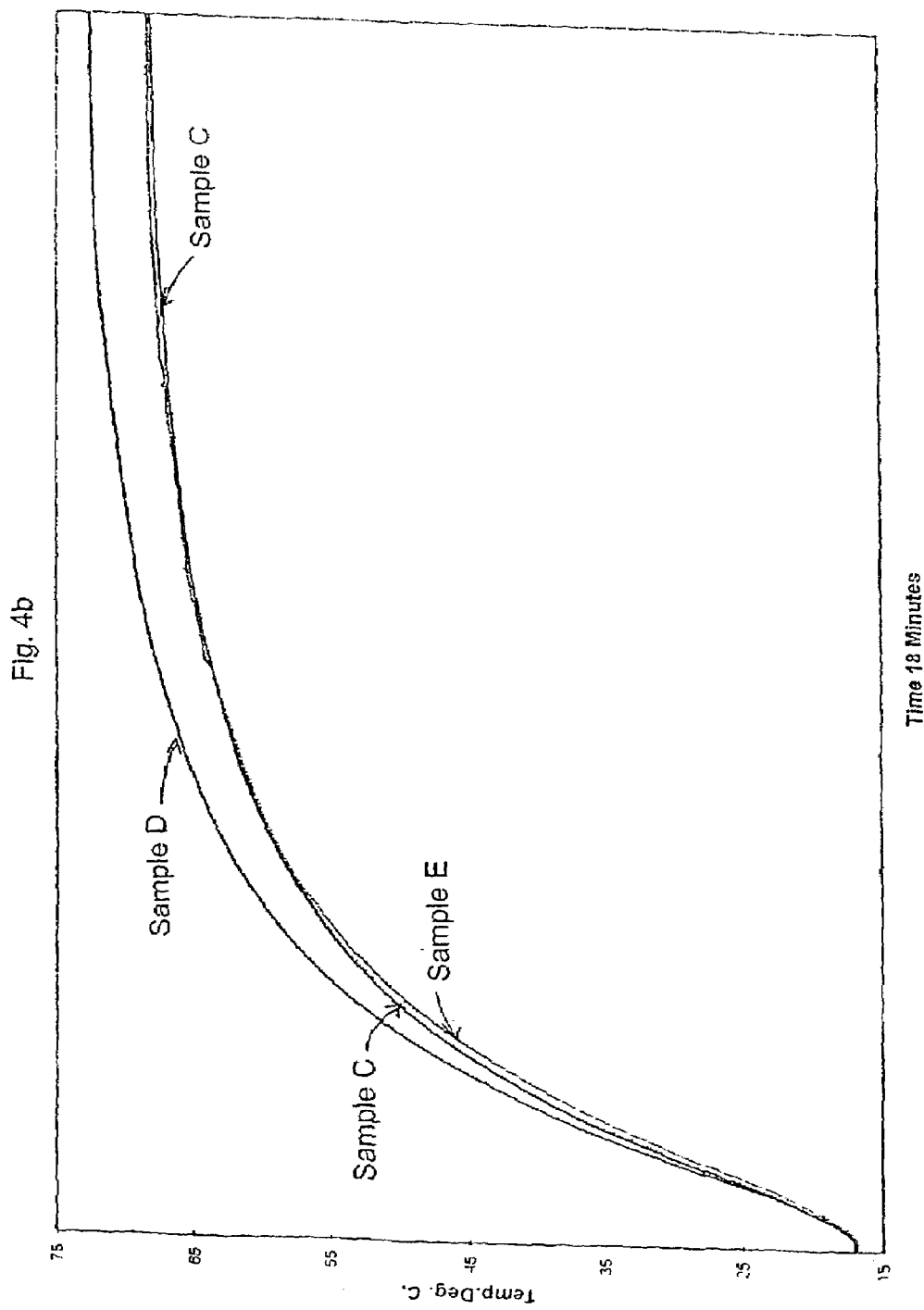

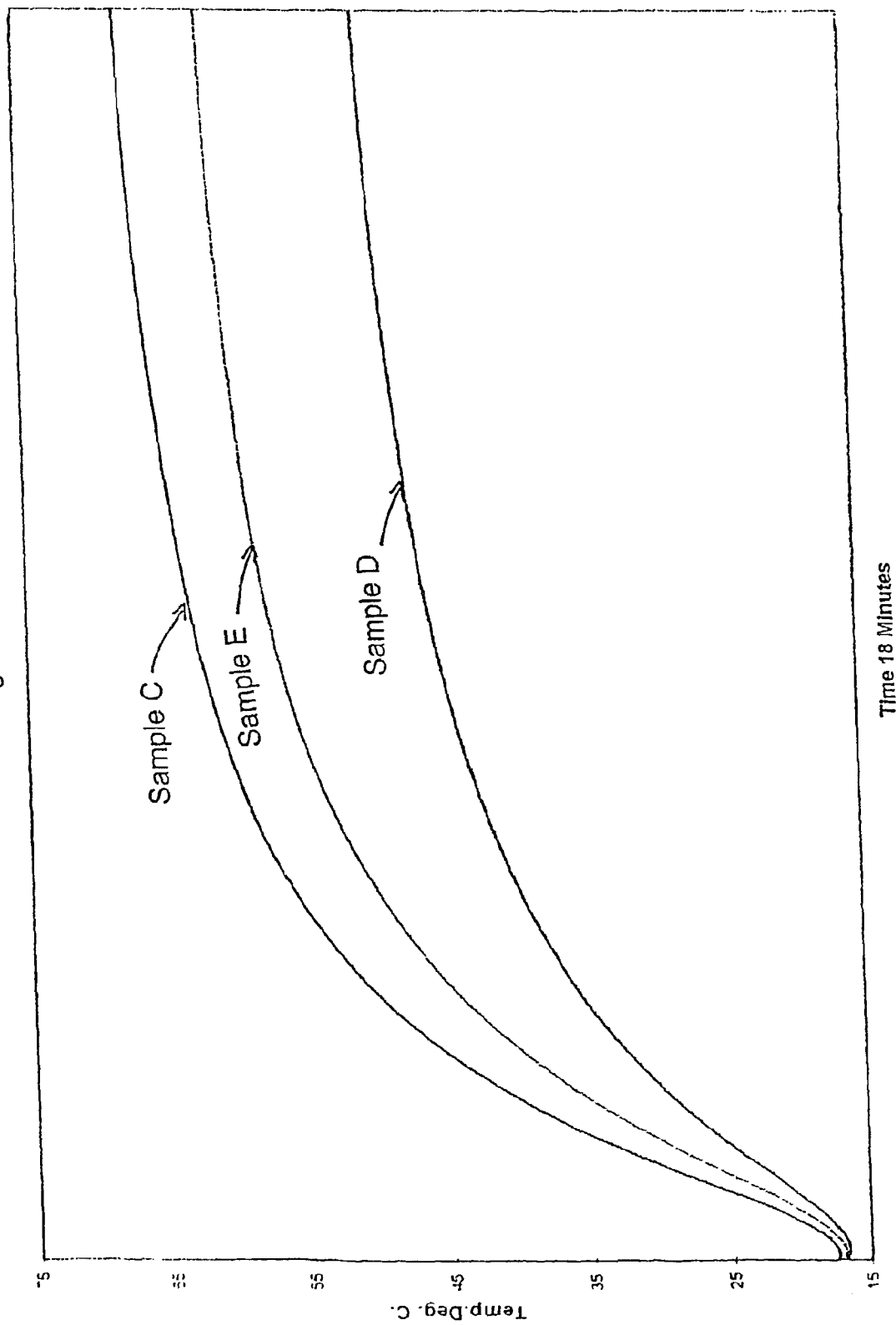

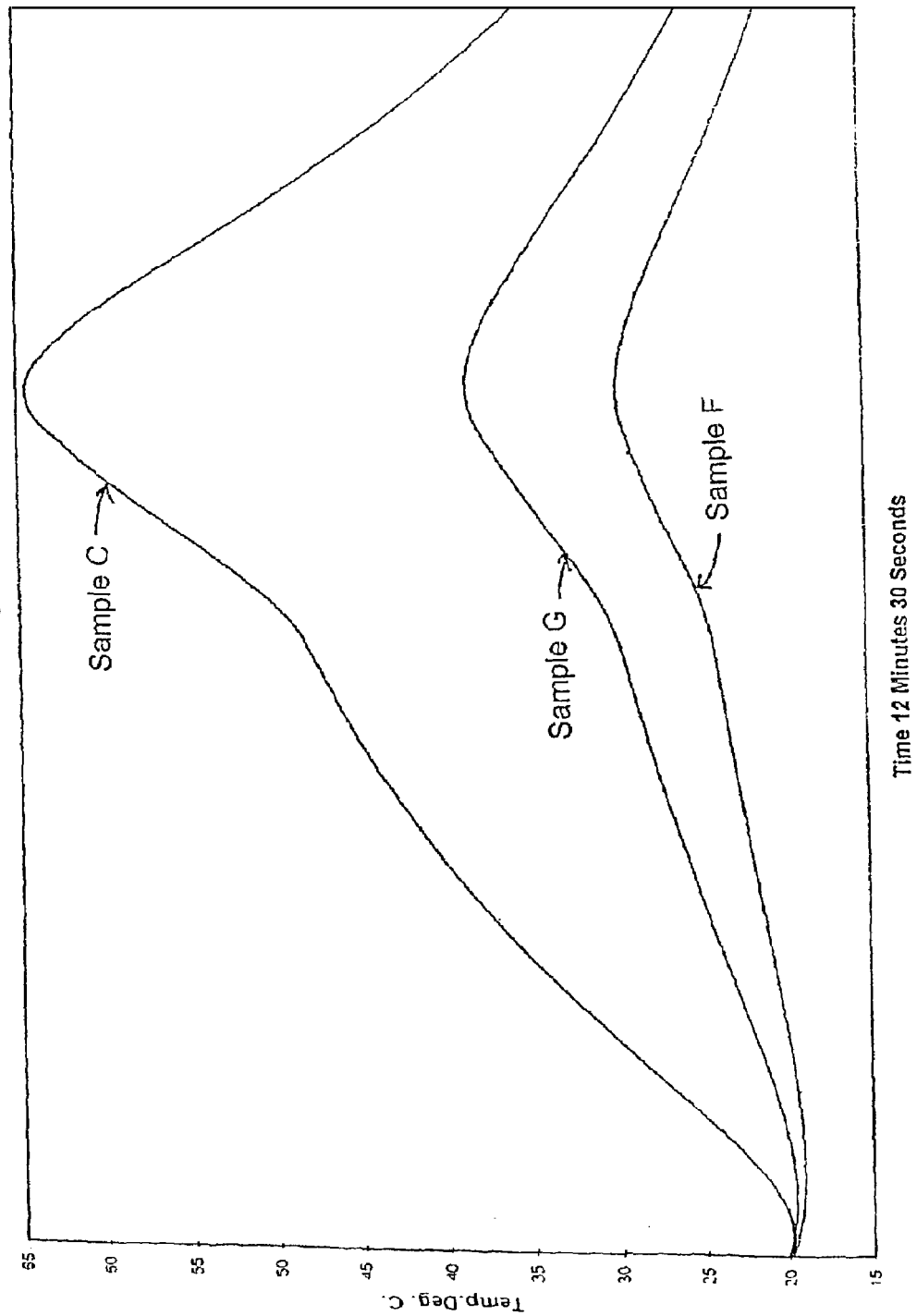

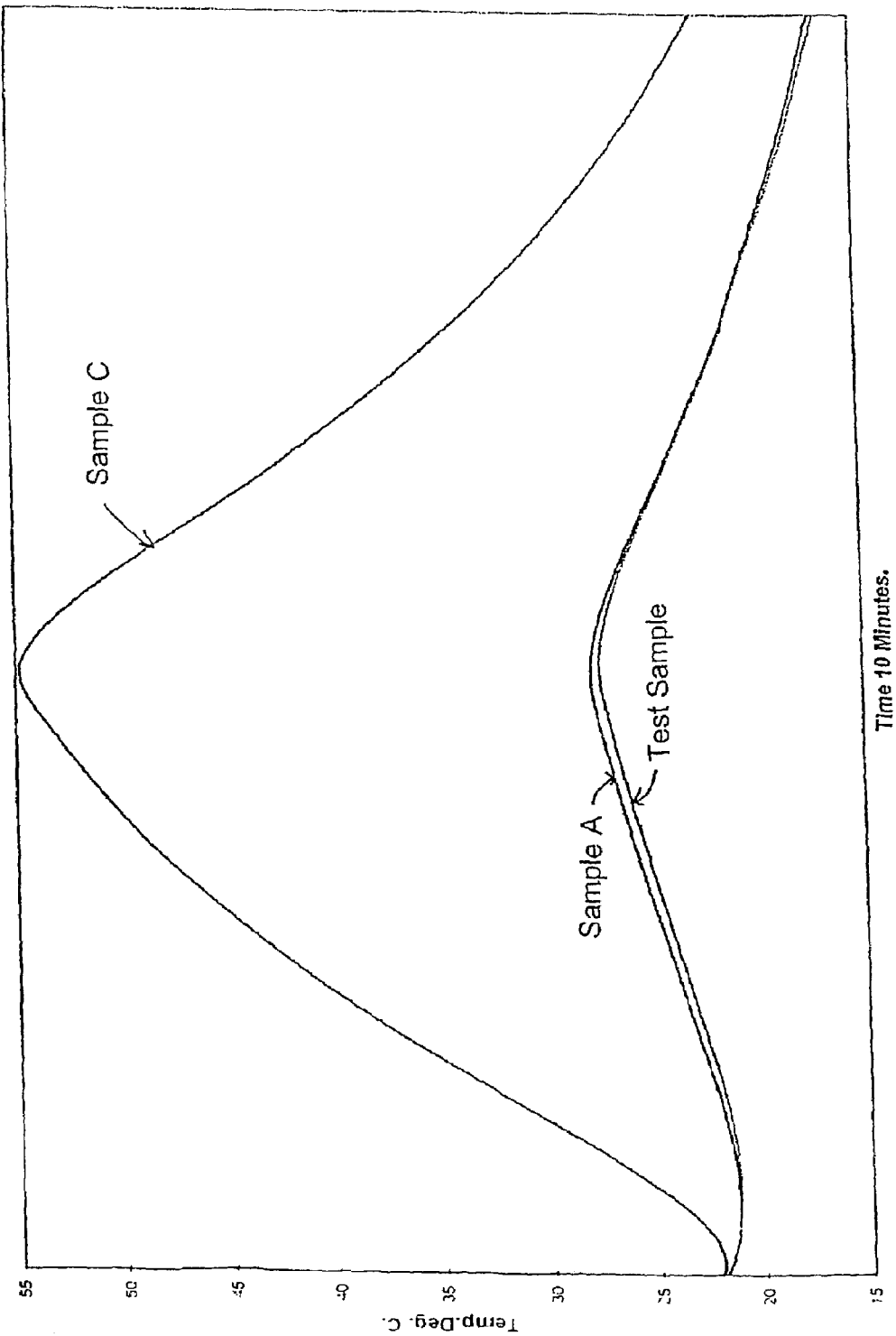

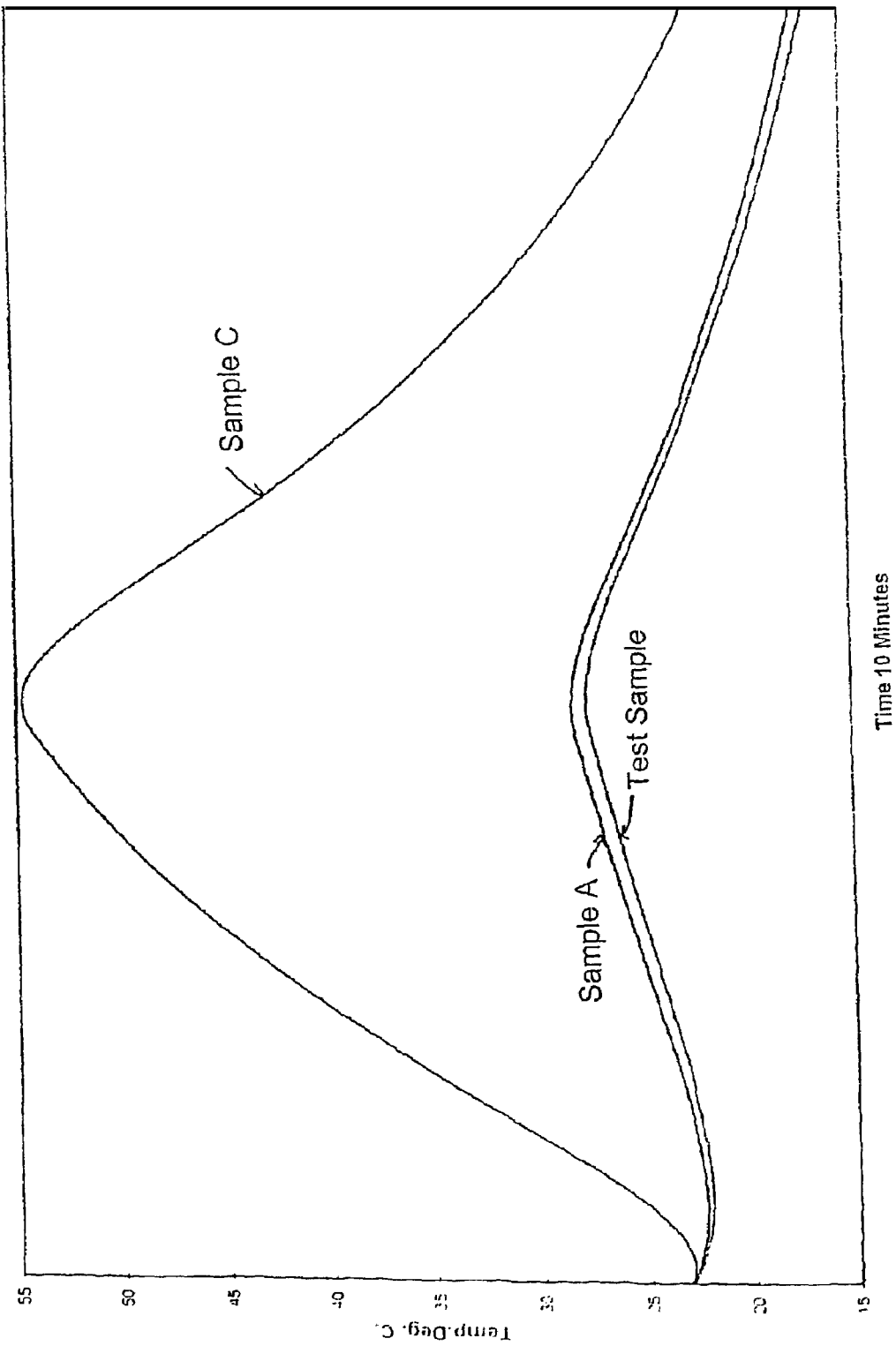

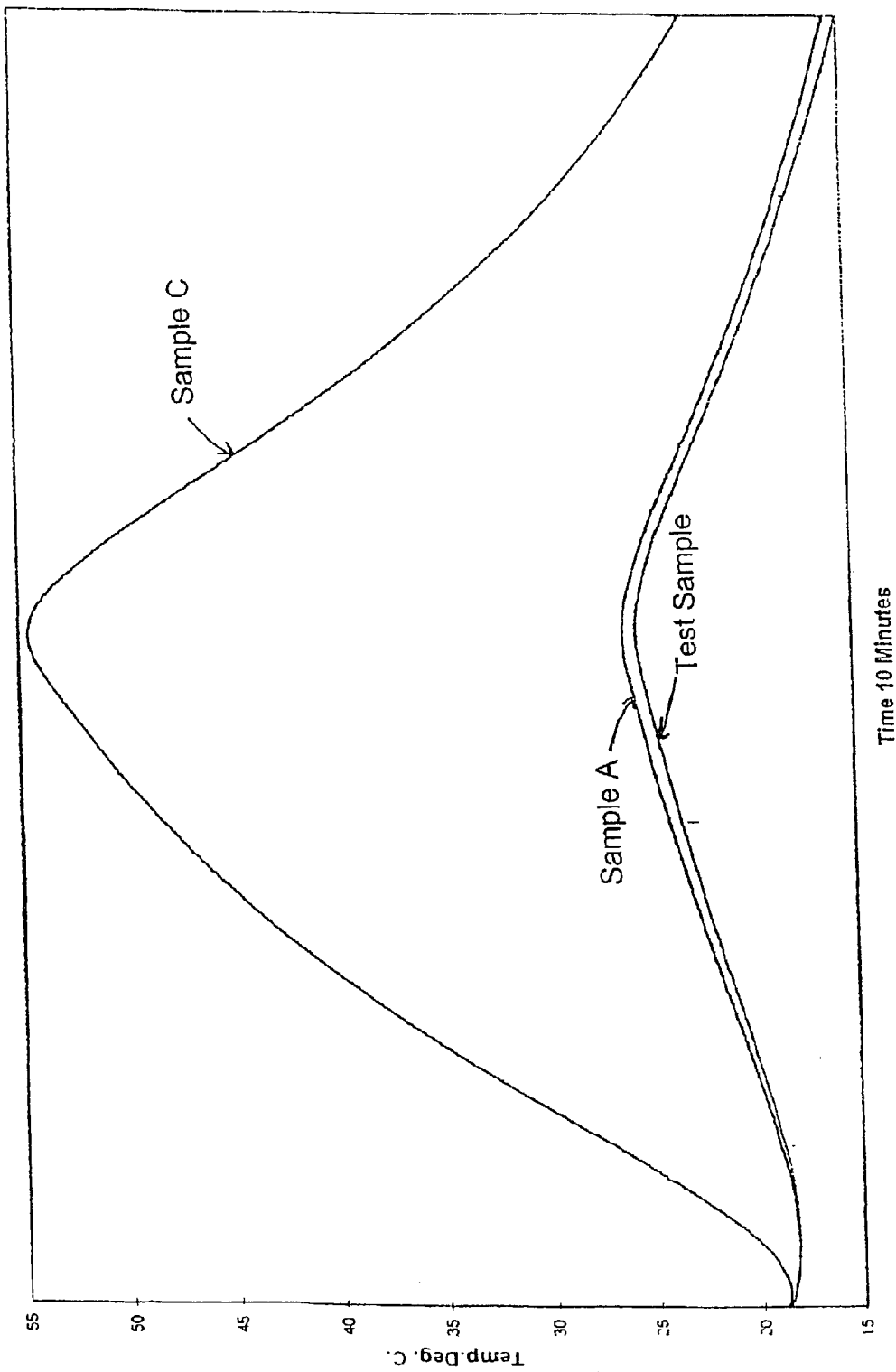

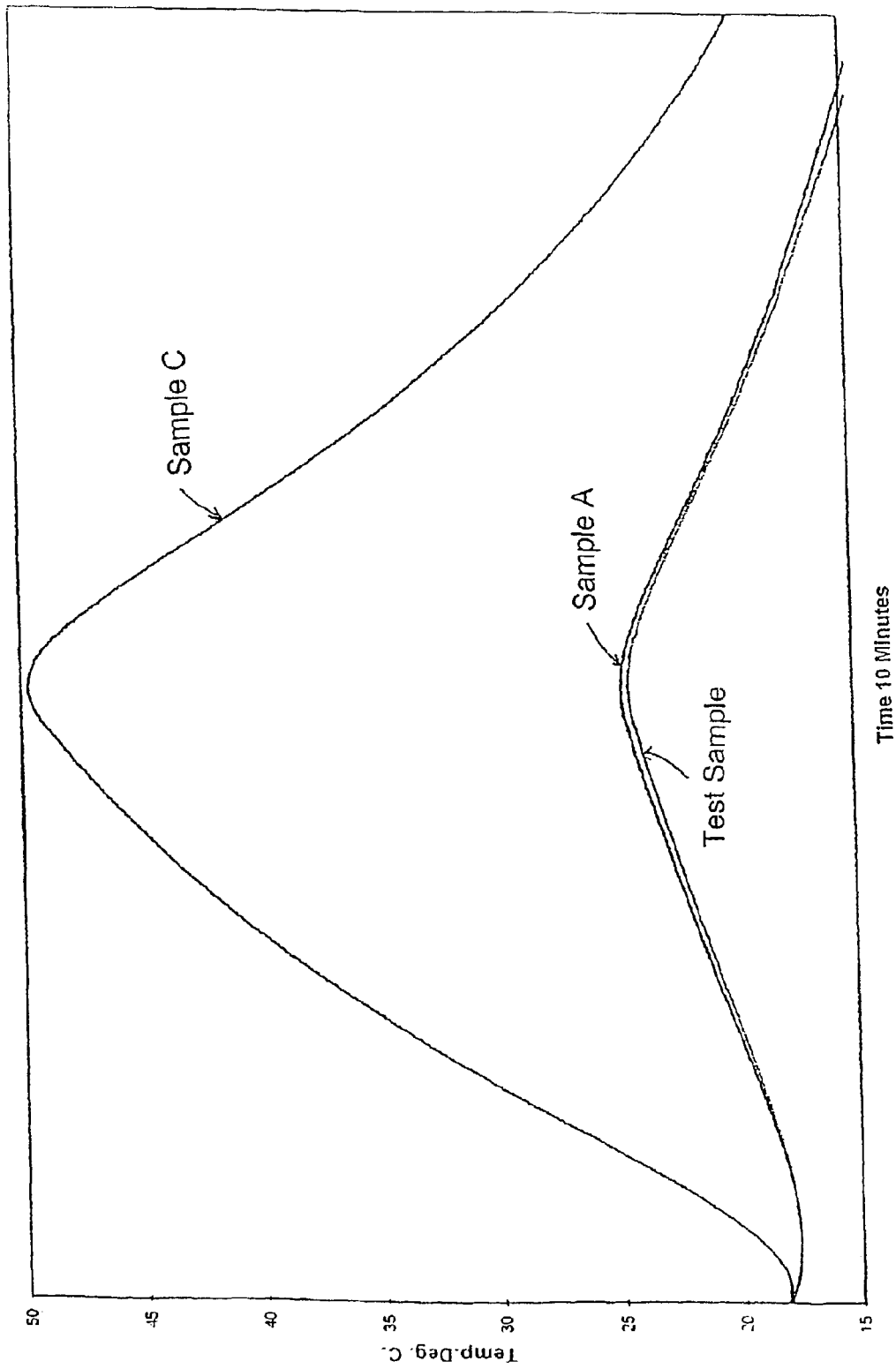

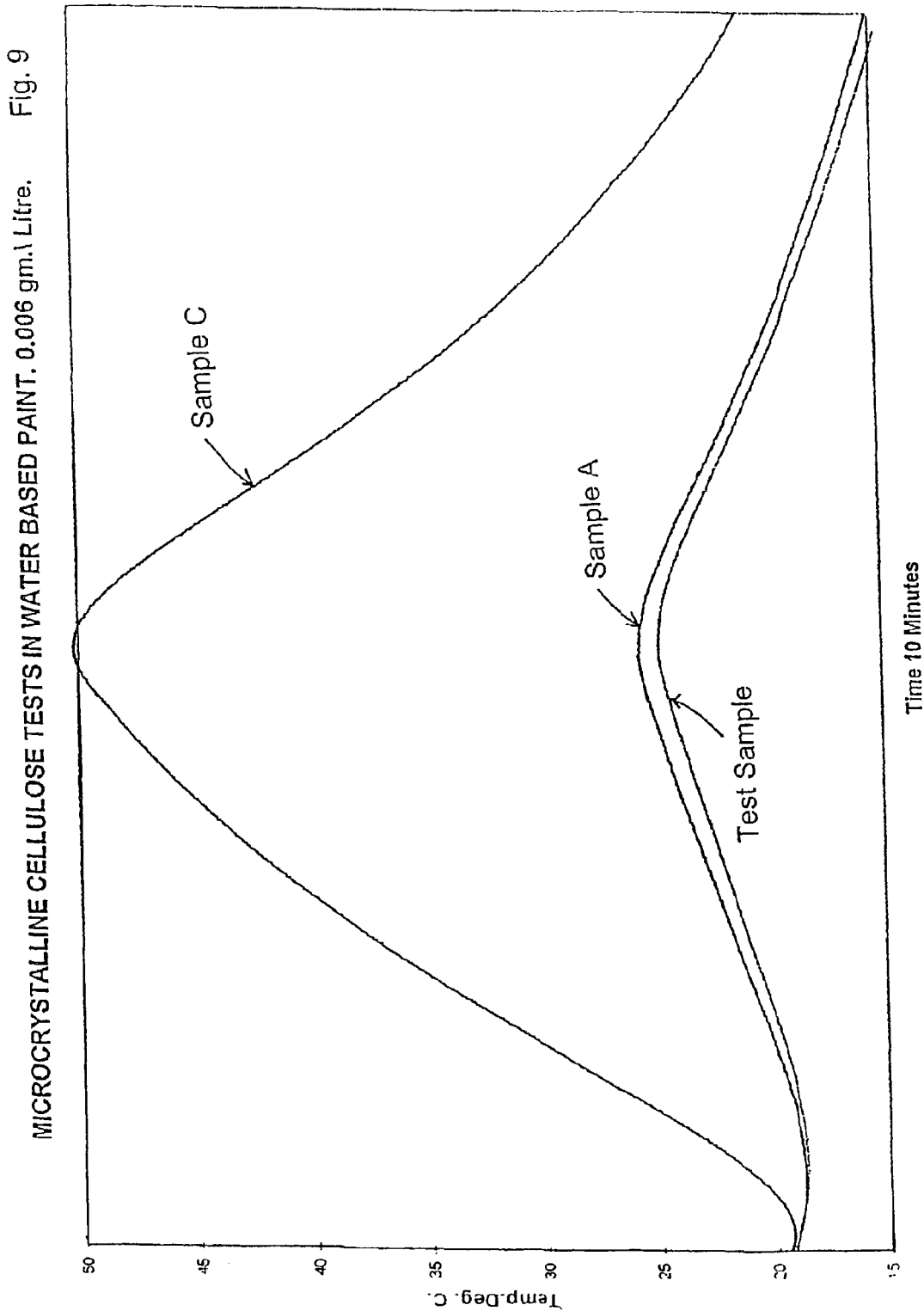

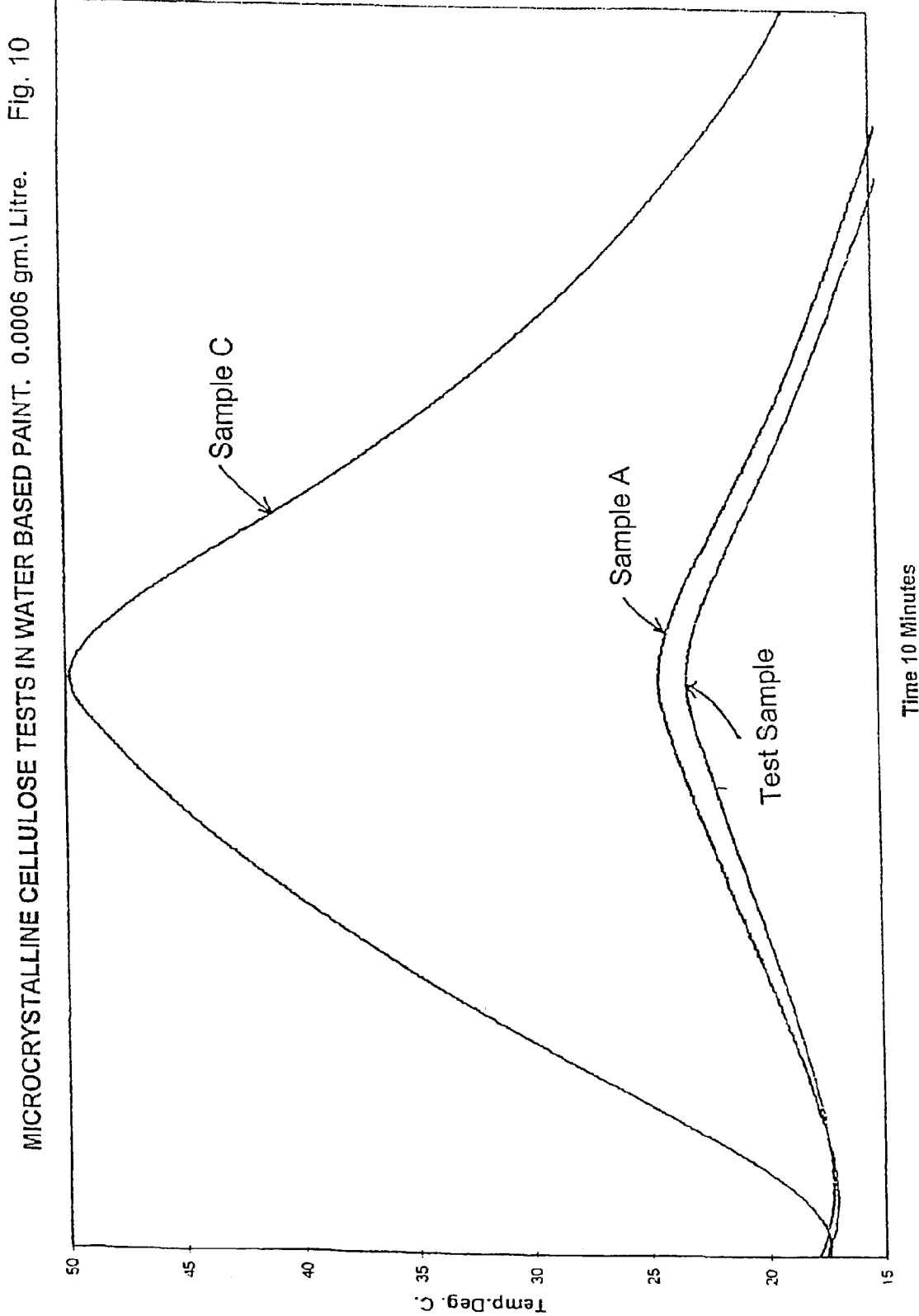

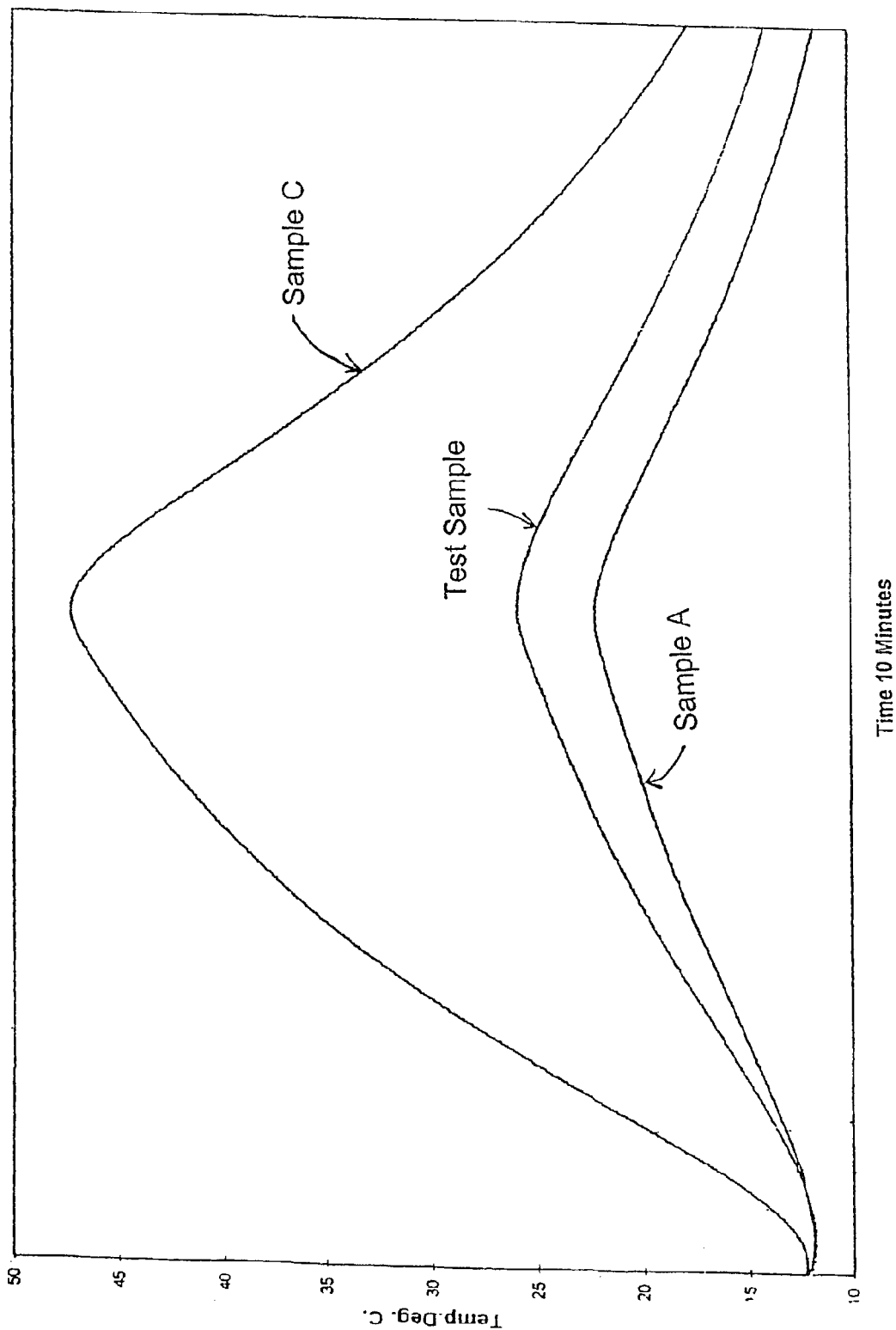

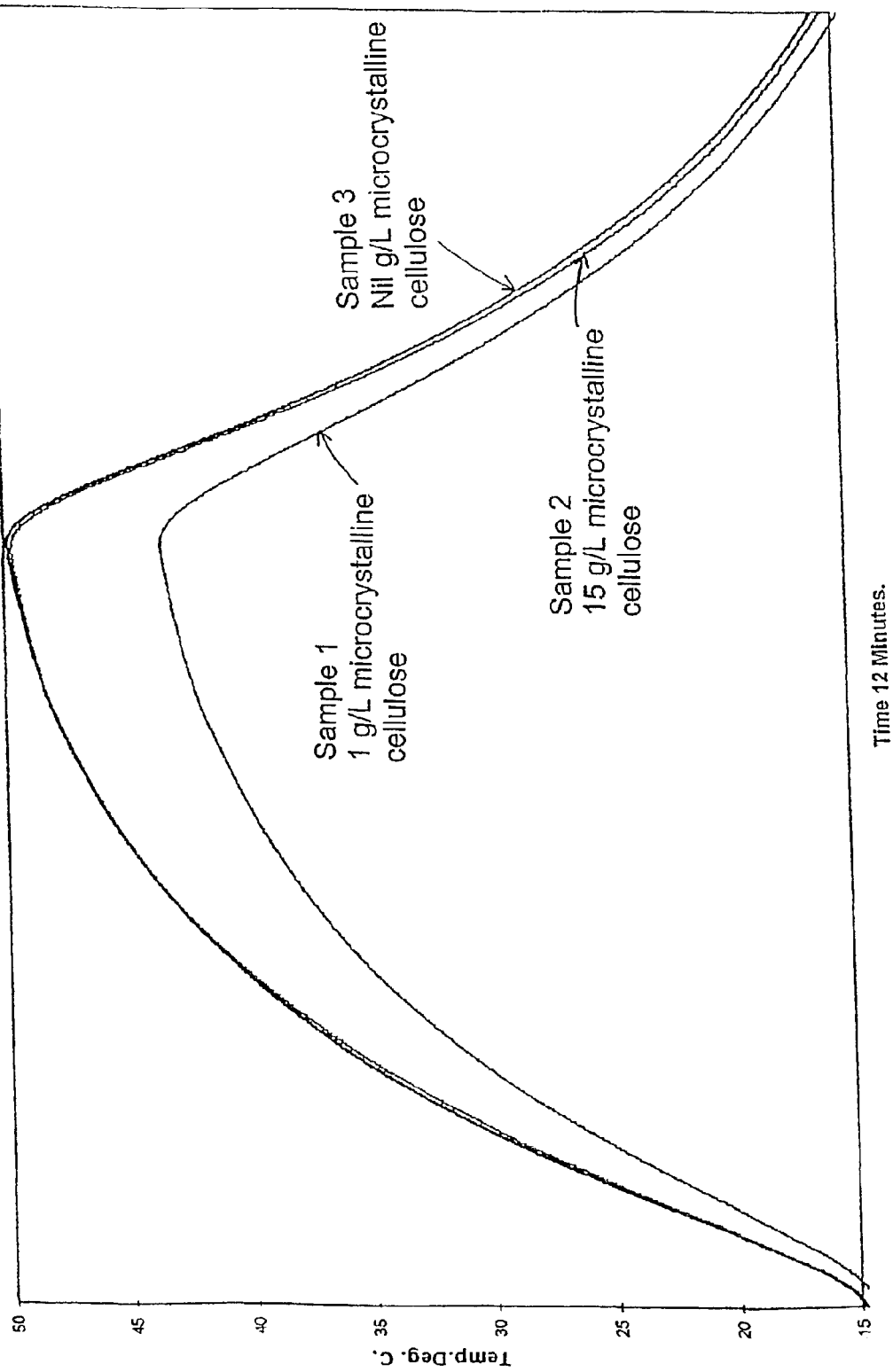

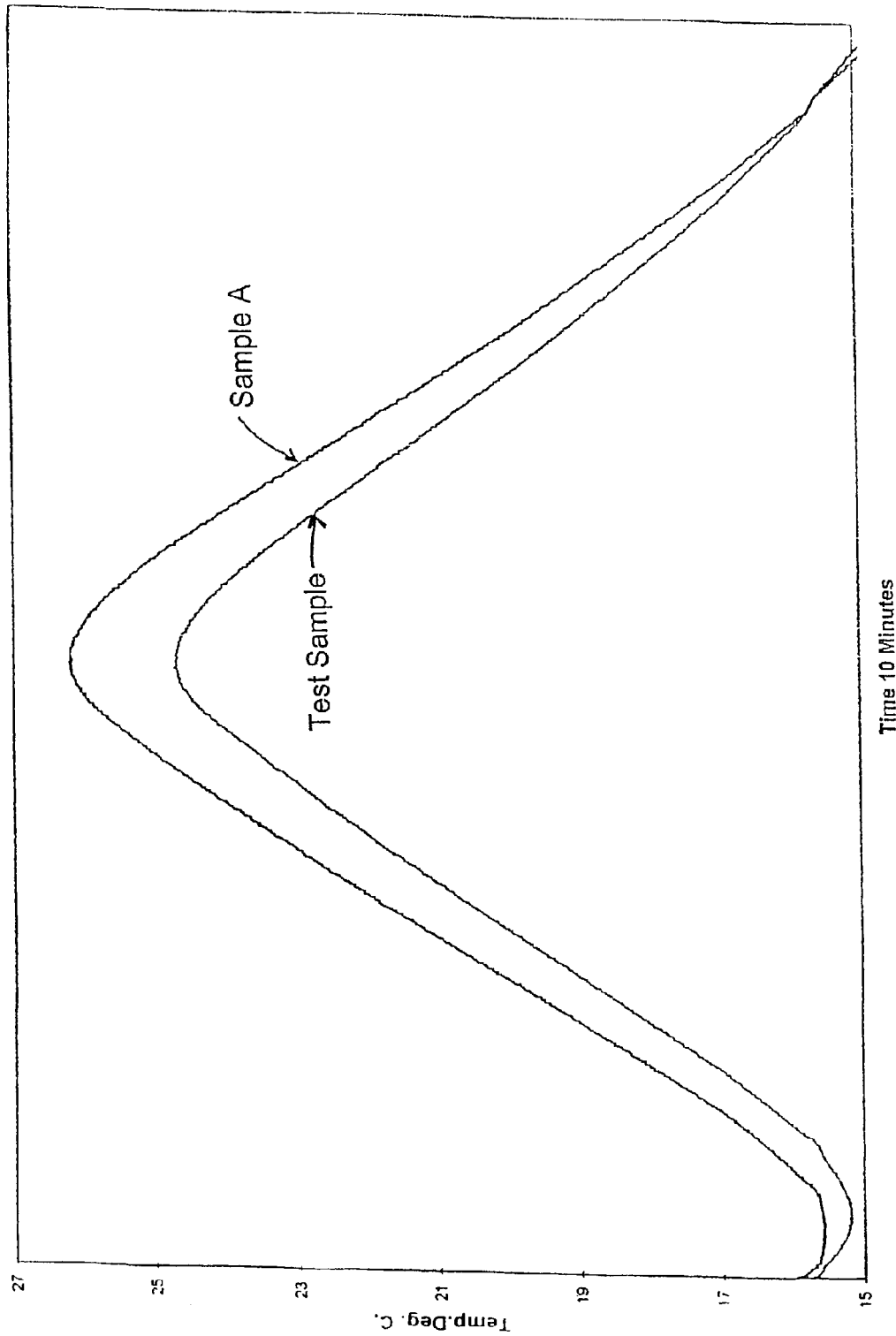

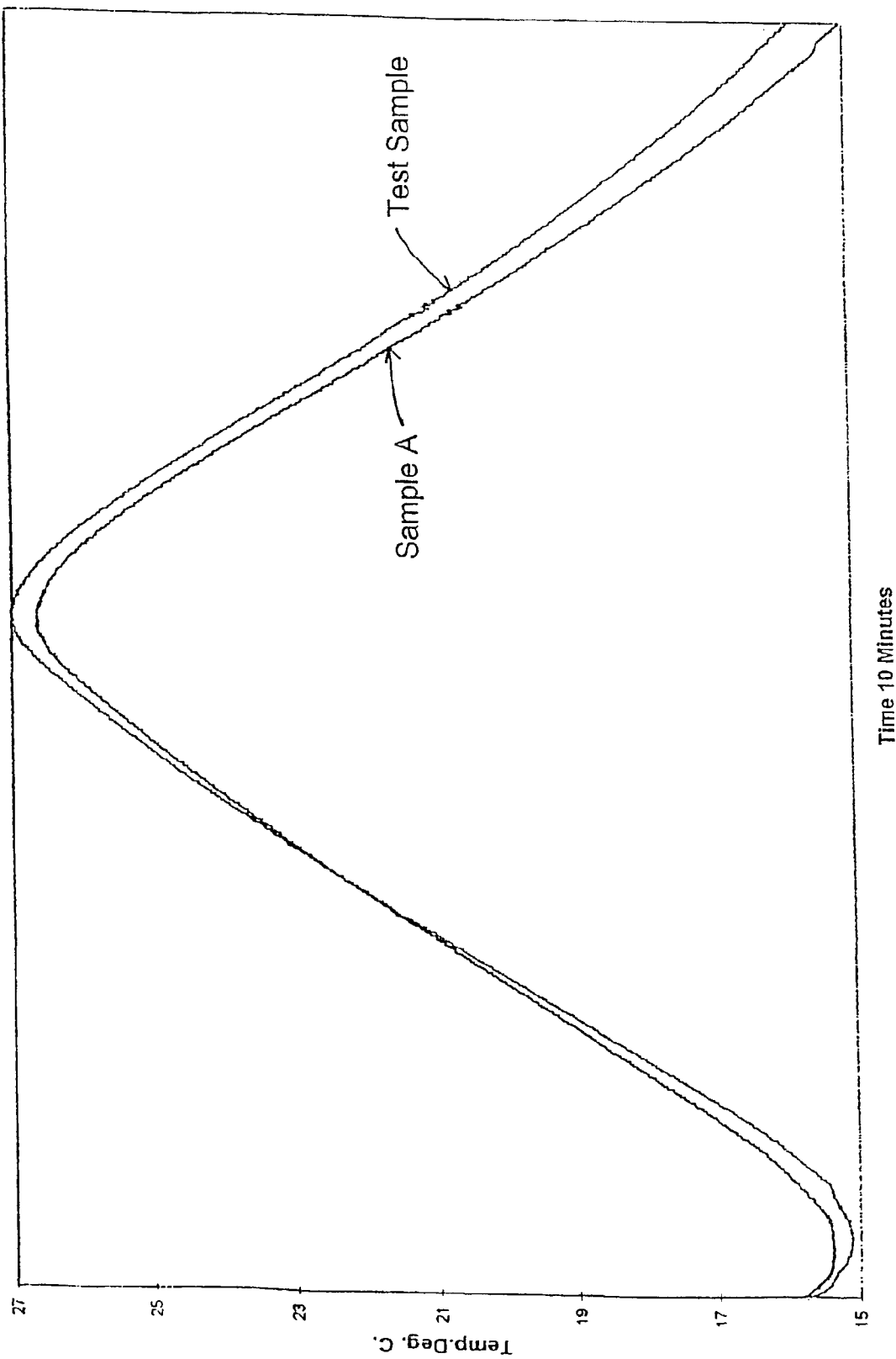

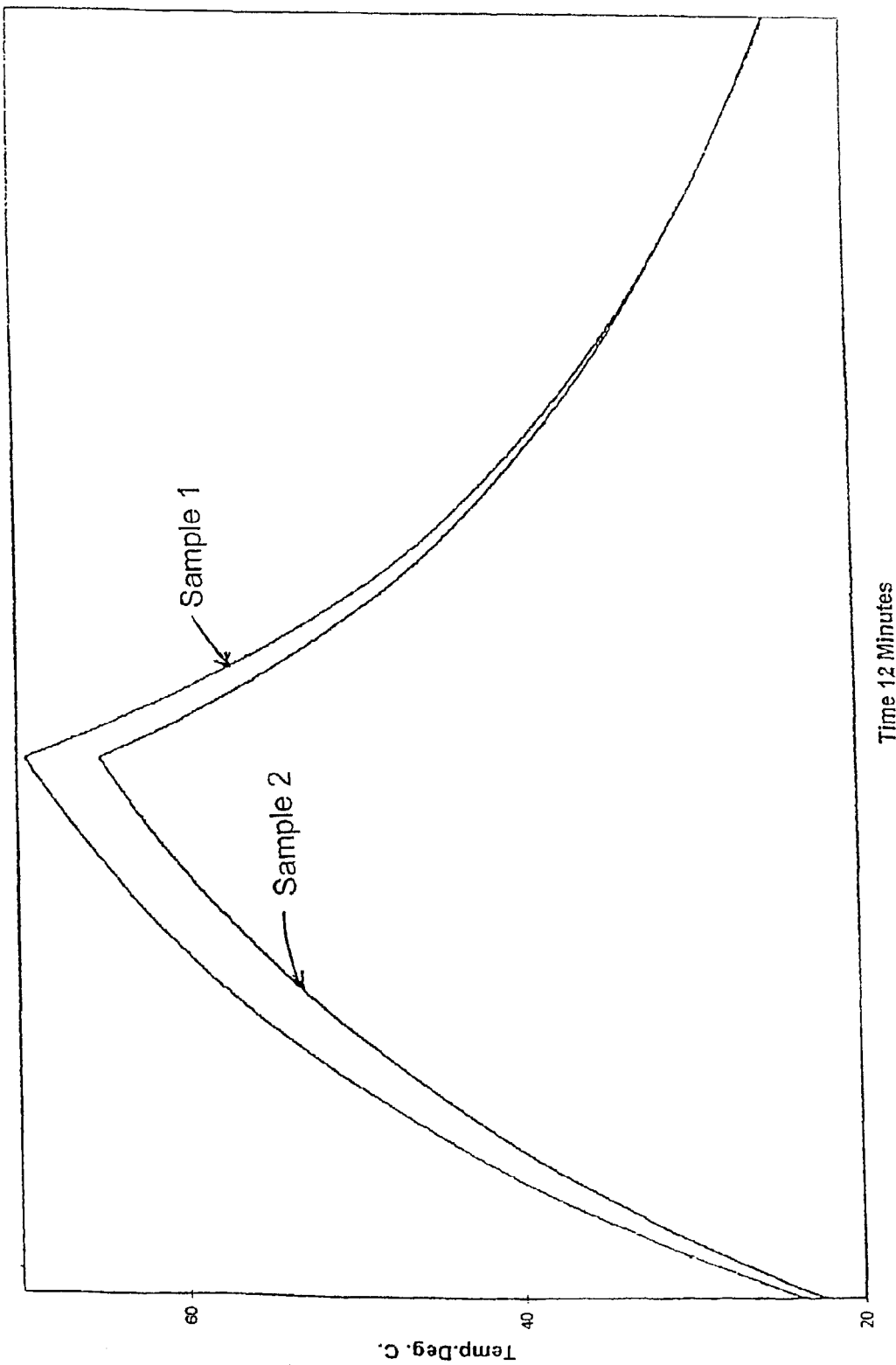

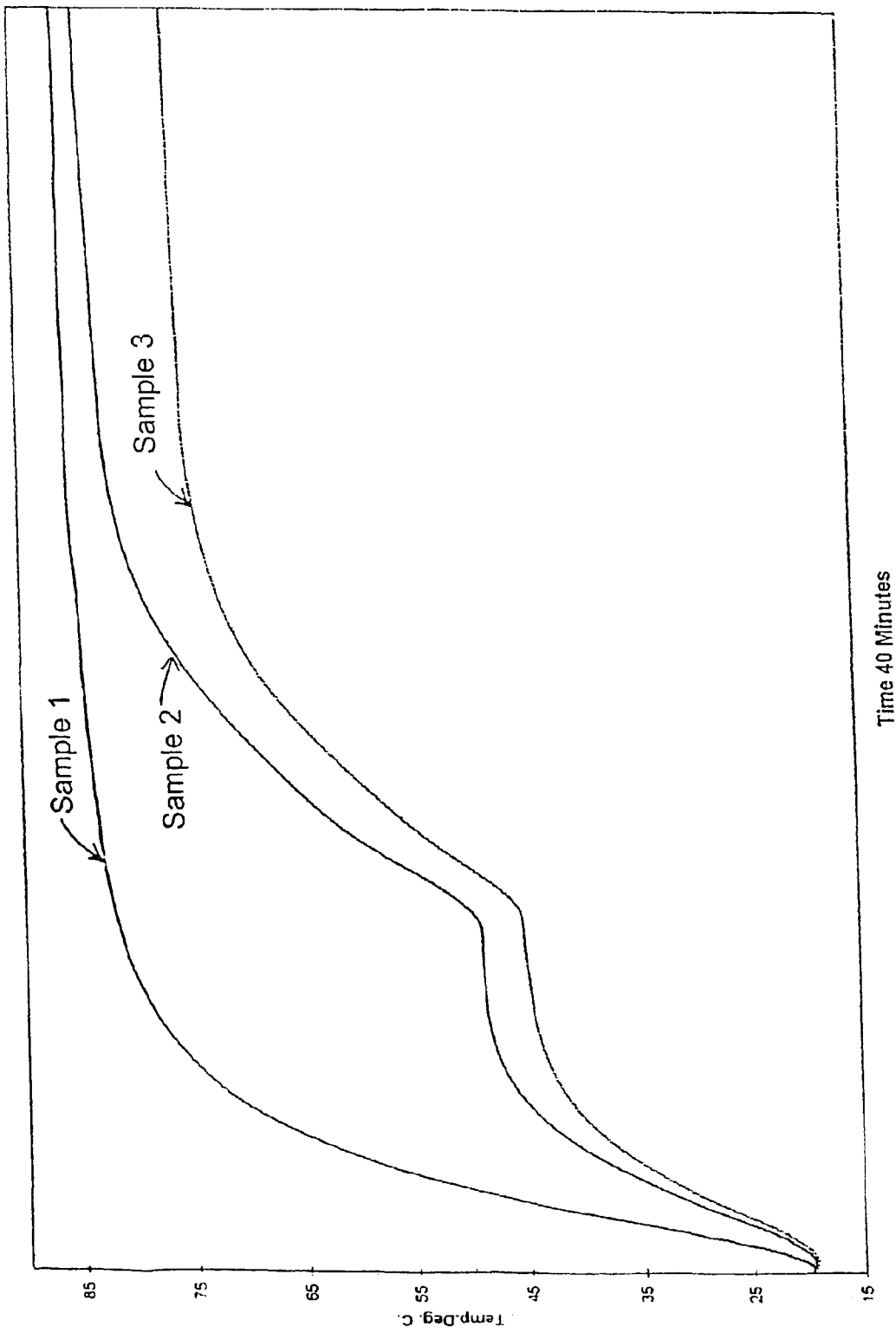

though not necessarily limited to paper coatings, the inventors have found coatings to be especially useful when applied to paper.

COATING COMPOSITION

TECHNICAL FIELD

The present invention relates to coating compositions which form coatings which have useful thermal properties.

BACKGROUND ART

It is well understood that heat can be transmitted from one place to another by three mechanisms, namely radiation, conduction and convection.

The benefits of insulating buildings and other structures have long been understood. Typically, buildings and other structures are insulated using poor thermal conductive materials such as fibreglass and wool. These materials are typically used in the walls and ceilings of structures to retard the transfer of heat into the structure during warmer months, and to retard the transfer of heat out of the structure during cooler months.

A number of attempts have been made to develop paints that effectively retard the transfer of heat through a surface to which the paint has been applied. For example, materials such as sodium bicarbonate and steric acid, potassium titanate fibres, glass frit, aluminium flakes, vermiculite, perlite and glass wool have all been considered as possible additives to paint to produce thermally insulating paints. Each of these additives has been of only limited value in producing thermally insulating paints. Further, the inclusion of such additives in paint often detracts from the desirable properties of paint, such as its ease of application to surfaces, and the aesthetic appearance of the paint coating.

One paint product which has been described as having good thermal insulative properties is described in the specification for Australian patent no. 601148. That specification describes a high build paint coating formed from a composition comprising a hardenable liquid paint base, silica particles and bagasse particles, wherein the silica and bagasse particles comprise up to 60 percent by weight of the mixture. This coating is described as being effective in maintaining a reduced temperature in the interior of a structure subject to radiant heat compared to an equivalent unpainted structure. The described composition does however suffer from a number of disadvantages. The described dimensions of the bagasse particles included in the composition make the composition difficult to apply to a surface and may have undesirable effects on the appearance of the paint coating. Further, the large particle sizes of the silica and bagasse particles used in some embodiments of the invention result in coatings which are likely to suffer from fungal problems. The large particle sizes result in a very thin layer of the other components of the composition over the silica and bagasse particles in the coating formed from the composition. In some embodiments, this thin layer does not provide adequate protection from moisture reaching the bagasse particles thereby allowing the growth of fungi. Further, the required thickness of the paint coating to render it effective make the composition an unsuitable product for use in applications where thinner coatings of paint are required, such as interior and exterior house paints and automotive finishes.

The specification for Australian patent application no. 10487/92 describes the use of microcrystalline cellulose particles having an average particle size of 1 to 10 μm in paper coating compositions. The paper coating compositions described in that specification comprise the particles of cellulose in an aqueous suspension. The paper coating compositions described in that specification are said to be useful for enhancing the performance of commercial optical brighteners. There is no suggestion or indication in that document that coatings formed from the compositions disclosed in that document may have an effect in altering the transfer of heat through paper or any other surface to which the coating composition is applied.

DISCLOSURE OF THE INVENTION

The inventors have surprisingly found that coating compositions containing cellulose particles having an average dry particle size of less than 10 microns (10 μm) dispersed throughout the coating composition produce coatings which have useful thermal properties.

In one aspect, the present invention provides a coating composition comprising
(i) a supporting medium, and
(ii) a plurality of cellulose particles, having an average dry particle size of less than 10 μm, dispersed in the supporting medium in an amount of less than about 10 g/L, excluding aqueous coating compositions adapted for application to paper.

The cellulose particles can be obtained by any means known in the art for obtaining cellulose particles having an average dry particle size of less than 10 μm. The cellulose particles can be obtained from cellulose fibres, cellulose derivatives or a combination of both. The cellulose particles can be derived from suitable natural materials such as radiata pine and macadamia shells. Such cellulose particles can be micronised to achieve the desired average dry particle size. Preferably, the cellulose particles comprise particles of microcrystalline cellulose. Commercially available microcrystalline cellulose particles which may be used in the coating composition according to the present invention include Avicel 1.02330.0000 produced by Merck Australia Pty Ltd for thin film chromatography. This product consists of microcrystalline cellulose particles present in the form of rod shaped particles having an average size of 4×25 μm. When added to a liquid supporting medium and dispersed under high shear, these particles break up into particles having an average dry particle size of approximately 4×7 μm.

In some embodiments of the invention, the cellulose particles have an average dry particle size of less than 1 μm.

Preferably, substantially all of the cellulose particles have substantially identical particle size, that is, particle sizes within 20 percent of the average particle size in the composition.

The amount of cellulose particles in the coating composition is less than about 10 g/L, typically in the range 0.0002 g/L to 10 g/L. Typically, the amount of cellulose particles in the coating composition is less than 5 g/L. A coating composition according to the present invention may, for example, contain cellulose particles in an amount within the range 0.01 g/L to 0.1 g/L, or within the range 0.0002 g/L to 0.01 g/L.

Typically the supporting medium is a liquid medium which when applied to a surface forms a coating on the surface. As used herein, the term "liquid" is taken to include amorphous, gelatinous, fluid and pourable substances.

Typically, the supporting medium is a liquid paint based composition which when applied to a surface and dried forms a dry paint coating on the surface. A liquid paint based composition typically consists of a polymer, solvents, various additives and often pigments. In some embodiments of the invention, a chemical reaction crosslinking the polymer in the liquid paint based composition occurs when the coating composition is applied to a surface and dried. Paint based compositions typically contain polymers such as polyesters, alkyds, acrylics, polyurethanes, epoxies, vinyls, polyamides, silicones, or combinations of these polymers. Solvents typically used in liquid paint based compositions include water or organic or inorganic solvents.

Suitable liquid supporting media can also be a non-paint based composition that can solidify to form a coating on a surface. Examples of such media include polymeric compounds (e.g. polyethylene, poly(vinylchloride), polypropylene, nylons), or resin or paper compositions.

Suitable liquid supporting media can also be a medium that does not solidify when applied to a surface, but rather forms a gelatinous or viscous liquid coating on the surface.

The supporting medium can also be a media adapted for forming free standing coating compositions, such as film-like materials, which can be applied to a surface to form a coating on the surface. For example, a clear plastic film adapted for application to glass, such as a window, to form a coating on the glass.

The supporting medium may also be an adhesive. For example, the supporting medium may be an adhesive layer applied to a surface of a window film to bond the window film to glass or to further sheets of window film in the case of a multi-layered window film.

The supporting medium may be a conventional coating composition, such as a conventional paint based coating composition.

The cellulose particles may be dispersed in the supporting medium by means known in the art. When the supporting medium is a liquid, such as a liquid paint based composition, the cellulose particles are typically dispersed under high shear, typically using equipment known as a High Shear Disperser. When the supporting medium is a media adapted for forming a free standing coating composition, such as a plastic film, the cellulose particles are typically dispersed in the supporting media during the manufacture of the coating composition.

The coating compositions according to the present invention may be applied to a surface to form a coating on the surface by any means known in the art for applying similar coating compositions not containing cellulose particles to a surface to form a coating on the surface.

When the supporting medium is a conventional coating composition, the coating composition according to the present invention may be applied to the surface of articles or structures to form a coating on the surface using standard techniques known in the art for applying the conventional coating composition to a surface to form a coating on the surface. For example, when the supporting medium is a conventional paint based composition, the coating composition of the present invention may be painted on the surface of an article or structure and dried to form a coating on the surface.

The coating composition may be adapted for forming a coating on a natural or artificial material. In various embodiments of the invention, the coating composition is adapted for forming a coating on a plastic material, a fabric, a fibre, a film, a ceramic, a composite material, concrete, wood, human or animal skin or metal or metal alloy.

In some embodiments, the coating composition is adapted for forming a coating on a portion of an article or structure such as a vehicle, building, transportable container or a storage tank. In some embodiments, the coating composition is adapted for forming a coating on walls, roof or other parts of a building. Similarly, in some embodiments of the invention, the coating composition is adapted for forming a coating on a surface of an automobile.

In a preferred embodiment, the coating composition is a paint based composition adapted to dry to form a dry film coating of a thickness of between 2 and 250 μm when applied to a surface. In the case of paint based compositions adapted for application to the interior or exterior of structures such as buildings, the paint based composition is preferably adapted to dry to a dry film thickness of between 35 and 120 μm. In the case of paints for use as automotive finishes, the paint based composition is preferably adapted to dry to a thickness of between about 20 and 70 μm.

In another aspect, the present invention provides a coating formed from a coating composition according to the present invention.

The coating can be a solid material, a film-like material or a gelatinous or viscous liquid material.

In a further aspect, the present invention provides an article or structure wherein at least one surface of the article or structure has applied to it a coating formed from a coating composition according to the present invention.

In various embodiments of the invention, a coating according to the present invention may form one or more layers of a multi-layer coating. For example, a coating according to the present invention may form an undercoat or first coating layer on a surface, with a top coat formed over the undercoat layer using a coating composition not containing cellulose particles.

The present inventors have surprisingly found that the coatings according to the present invention have useful thermal properties.

The inventors have found that when a coating according to the present invention is applied to a surface, and the coated surface is exposed to radiant heat, the coating reduces or increases the heat transferred through the surface compared to similar coatings formed from coating compositions not containing particles of cellulose.

For example, when a coating according to the present invention is applied to the external surfaces of a metal structure, and the structure is exposed to radiant heat, the coating insulates the structure maintaining the interior of the structure at a temperature significantly lower than that of an equivalent structure having a coating formed from a similar coating composition not containing particles of cellulose, or an equivalent structure having no coating on the external surfaces.

Further experiments undertaken by the inventors also suggest that if the ambient temperature outside the structure falls below the internal temperature of the structure, the coating on the external surface of the structure serves to facilitate the transmission of heat out of the structure at a more rapid rate than an equivalent structure having a coating on the external surfaces formed from a similar coating composition not containing cellulose particles, or an equivalent structure having no coating on the external surfaces. This is a particularly useful feature for structures such as buildings containing heat generating machinery, such as electric motors, welding bays or the like.

When the coating is a plastic film applied to a glass surface such as a window, and the coated surface exposed to radiant heat, the inventors have found that the coating increases the heat transferred through the surface compared to a similar plastic film coating not containing cellulose particles.

The inventors have also surprisingly found that the smaller the average particle size of the cellulose particles dispersed in the coating composition, the lower the proportion of cellulose particles required to be added to the composition to maintain the useful thermal properties of coatings formed from the composition. For example, a paint coating of 200 μm dry film thickness formed from a liquid paint based composition according to the present invention containing 1 g/L of microcrystalline cellulose particles has similar thermal properties to a paint coating formed from a composition containing about 15 g/L of micronised cellulose particles having average size of about 16 µm in a coating of 200 µm dry film thickness. Experiments by the inventors have also demonstrated that the thermal properties of coatings formed from coating compositions containing cellulose particles having an average dry particle size of less than 10 µm is retained as the proportion of cellulose particles in the composition is decreased from 1 g/L to 0.0002 g/L.

BRIEF DESCRIPTION OF DRAWINGS

Hereinafter by way of example only, preferred embodiments of the invention will now be described with reference to the accompanying drawings in which:

FIG. 4 is a temperature versus time graph of the non-exposed surfaces of Samples A, B and C tested in the apparatus depicted in FIGS. 2 and 3 wherein radiant heat was applied to the surface of Samples A and B having the coating (the coating being a water-based acrylic paint);

FIG. 4a is a temperature versus time graph of the non-exposed surfaces of Samples A, B and C tested in the apparatus depicted in FIGS. 2 and 3 wherein radiant heat was applied to the surface of Samples A and B not having the coating;

FIG. 4b is a temperature versus time graph of the non-exposed surfaces of Samples C, D and E tested in the apparatus depicted in FIGS. 2 and 3 wherein radiant heat was applied to the surface of Samples D and E not having the coating (the coating being a water-based acrylic paint);

FIG. 4c is a temperature versus time graph of the non-exposed surfaces of Samples C, D and E tested in the apparatus depicted in FIGS. 2 and 3 wherein radiant heat was applied to the surface of Samples D and E having the coating;

FIG. 4d is a temperature versus time graph of the non-exposed surfaces of Samples C, F and G tested in the apparatus depicted in FIGS. 2 and 3 wherein radiant heat was applied to the surface of Samples F and G having the coating (the coating being a water-based acrylic paint);

FIGS. 5-10 depict temperature versus time graphs of the non-exposed surfaces of Samples A and C and a third sample (the Test Sample) tested in the apparatus depicted in FIGS. 2 and 3 wherein radiant heat was applied to the surface of Sample A and the Test Sample having the coating (the coating being a water-based acrylic paint);

FIGS. 11 & 12 are temperature versus time graphs of the non-exposed surfaces of Samples A and C and a third sample (the Test Sample) tested in the apparatus depicted in FIGS. 2 and 3 wherein radiant heat was applied to the surface of Sample A and the Test Sample having the coating (the coating on the Test Sample being a polyurethane paint—2 pack, polyester base and isocyanate catalyst);

FIG. 13 is a temperature versus time graph of the non-exposed surfaces of three samples tested in the apparatus depicted in FIGS. 2 and 3 wherein radiant heat was applied to the-surface of the samples having the coating (the coating being a coil coating of the plastisol type).

FIGS. 14 & 15 are temperature versus time graphs of the non-exposed surfaces of Sample A and a second sample (the Test Sample) tested in the apparatus depicted in FIGS. 2 and 3 wherein radiant heat was applied to the surface of the samples having the coating (the coating on the Test Sample being a water based ink);

FIG. 16 is a temperature versus time graph of the non-exposed surfaces of two samples tested in the apparatus depicted in FIGS. 2 and 3 wherein radiant heat was applied to the surface of the samples having the coating (the coating being a window film);

FIG. 17 is a temperature versus time graph of the non-exposed surfaces of two samples having a foam coating and a third sample having no coating tested in the apparatus depicted in FIGS. 2 and 3 wherein radiant heat was applied to the surface of the samples having the foam coating (the coating being a fire fighting foam);

MODES OF CARRYING OUT THE INVENTION

Figure 1:
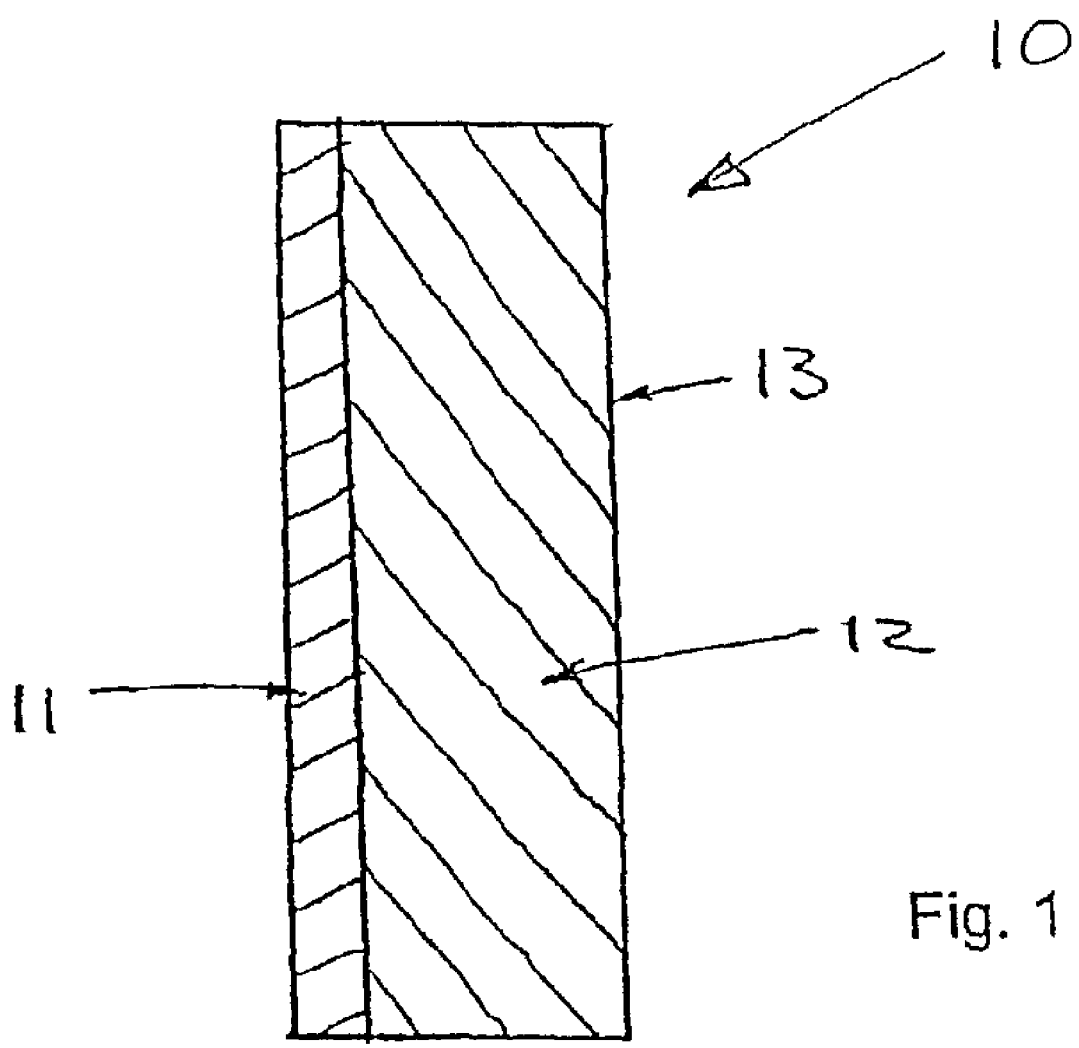
FIG. 1 is a cross-sectional view (not to scale) of the samples tested in the experiments described herein.

A cross-sectional view of the samples used in the experiments described herein is shown in FIG. 1. The sample 10 comprises a coating 11 applied to a surface of a substrate 12.

In all of the experiments described herein, other than the experiment involving window film coatings applied to glass sheets, the substrate 12 consisted of a steel plate of dimensions 200×300×0.9 mm. On one 200×300 mm surface of the steel substrate 12, a coating 11 was formed. The opposite 200×300 mm surface 13 of the steel substrate 12 was coated with a thin layer of conventional black paint. Such samples can be considered representative of coatings applied to structures such as buildings and vehicles.

To allow a comparison of the performance of coatings formed from coating compositions according to the present invention, experiments were initially undertaken by the present inventors on comparison or reference samples. A coating composition was prepared by adding cellulose particles at a ratio of 55 grams per liter to a water base acrylic paint composition and dispersed under high shear. The cellulose particles in this composition had an average particle size of 55 µm. The main reference sample (Sample A) comprised a steel plate of the dimensions referred to above. On one of the 200×300 mm surfaces of the steel plate a coating was formed from the prepared coating composition. The thickness of the paint coating on drying of the paint was measured to be 270 µm. As indicated above, the opposite 200×300 mm surface of the steel plate was painted with a thin layer of conventional black paint.

Figure 2:
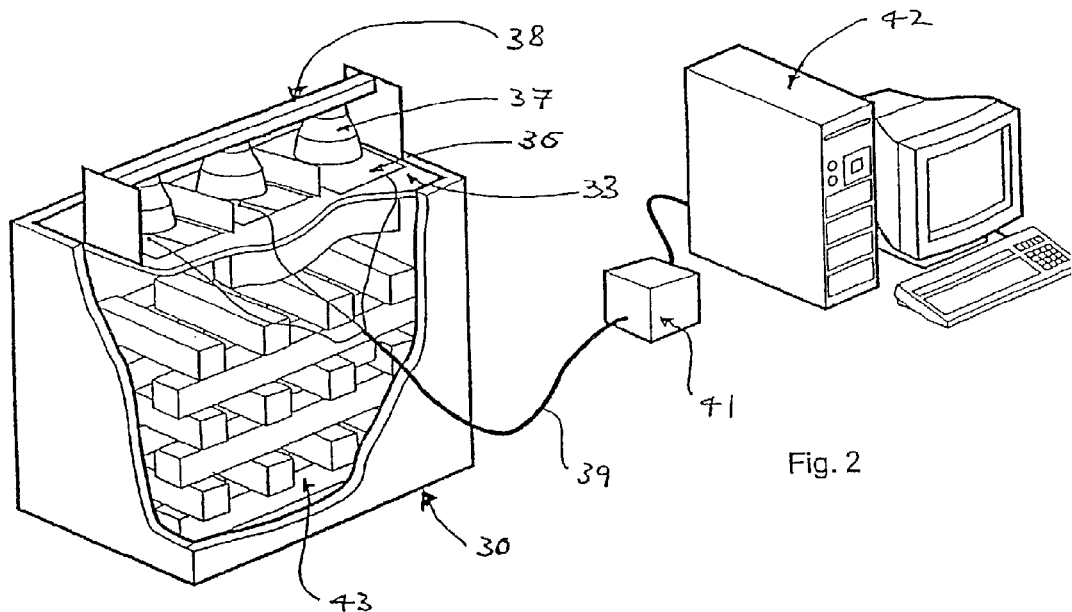
FIG. 2 is a diagrammatic view of a test apparatus.
Figure 3:
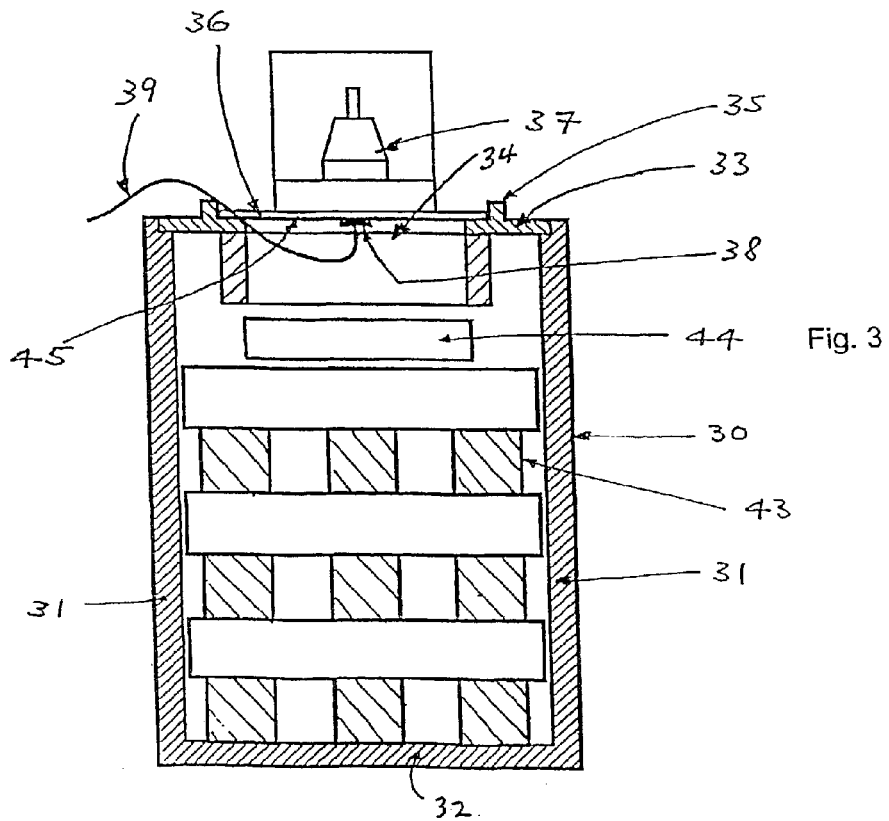
FIG. 3 is an enlarged cross-sectional view of the box 30 depicted in FIG. 2.

The reference sample and the other samples described herein were tested in the apparatus depicted in FIGS. 2 and 3.

The test apparatus comprises a box 30 acting as a heat sink and having walls 31 and a base 32. The walls 31 and base 32 are thermally insulated with polystyrene sheets to prevent heat loss and to also lessen the likelihood of external condensation. The box 30 contains column blocks of ice 43 laid in a lattice like fashion to maximize the absorption of heat within the box 30. Two multi-speed rotating blade fans 44 are also available to provide circulation and give a wind chill factor if desired.

The box 30 also has a top surface 33 having three identical rectangular holes 34 formed therein. Each hole is surrounded by a jig 35 which support a sample 36, such as the Sample A described above, to be tested by the apparatus. In FIG. 2 the right end rectangular hole 34 is concealed by the samples 36.

Above each of the samples 36 is mounted a light source 37 which provides a source of thermal irradiation to the top surface of the sample 36. The light sources 37 are suspended from a beam 38 which can be moved up and down to allow corresponding movement in the position of the light sources 37 above the samples 36.

Each light source comprises a 100 W tungsten lamp under the control of an electric circuit (not depicted). A thyristor control (not depicted) is provided in the electric circuit to allow the brightness of the light sources 37 to be adjusted as required.

Attached to the lower surface 45 of each sample 36 is a Type J thermocouple 38. The thermocouple 38 is attached to the lower surface 45 by means of double-sided adhesive tape. The position of the thermocouple 38 is set by the use of a template which ensures the thermocouple 38 is positioned in the center of the sample 36 directly below the center of the light source 37.

The thermocouple leads 39 extend out past a foam rubber strip sealing the box 30 and extend to an electronic cold junction 41 which is, in turn, connected to a computer 42. The computer 42 stores and displays the temperatures measured at the lower surface of each sample 36 by each thermocouple 38.

During the original set-up and calibration of the test apparatus, three polished aluminum sheets having a thickness of approximately 0.9 mm were mounted in the jigs 35 and tested to balance the output from the three thermocouples 38.

A normal experiment was conducted in the following manner:

(i) three samples 36 were selected for testing and then marked by a template to allow accurate location of the thermocouple 38 on the opposite 200×300 mm surface of sample to the 200×300 mm surface to be irradiated by the light source 37;

(ii) a thermocouple 38 was then attached using double-sided adhesive tape to each sample 36 on the opposite 200×300 mm surface of the sample to the 200×300 mm surface to be irradiated by the light source 37;

(iii) the three samples 36 were then brought to ambient room temperature by placing them in front of a rotary fan for several minutes;

(iv) the three samples 36 were then rapidly loaded into the jigs 35 so that the surface of the samples 36 to be irradiated by the light sources 37 faces the light source, and the light sources 37 switched on;

(v) the computer program was then started and the temperature of the lower surface 45 of each sample 36 (i.e. the 200×300 mm surface opposite to the 200×300 mm surface irradiated by the light source 37) was, stored and displayed by the computer 42.

In most experiments, the light source was turned off after a few minutes, and the temperature of the lower surface 45 of each sample 36 was stored and displayed by the computer 42 while the light source was on and for a period of time after the light source was turned off.

In a first experiment, a reference sample (Sample A) as described above was compared with a similar sample (Sample B) having a paint coating formed from the same water based acrylic paint composition used for Sample A but not containing cellulose particles, and a sample consisting a steel plate of dimensions 200×300×0.9 mm painted with a thin layer of conventional black paint on both of the 200×300 mm surfaces (Sample C). A thermocouple was attached to each of the samples such that the paint coating 11 of Samples A and B was irradiated by the light source 37 when the samples were placed in the test apparatus.

The samples were appropriately placed in the test apparatus and the light sources 37 illuminated. The temperature measured by the thermocouples 38 was recorded by the computer 42.

The results of the first experiment are depicted in FIG. 4. The results indicate that the temperature of the unexposed surface of Sample A only reached a maximum of approximately 37° C. whereas the temperature of the unexposed surface of Sample B and Sample C reached a maximum temperature of approximately 42° C. and 67° C., respectively. These results demonstrate that the coating formed from the coating composition containing the cellulose particles reduced the magnitude of heat transferred through the sample to which the coating was applied compared to the coating formed from the coating composition not containing cellulose particles.

In a further experiment, the same samples as tested above (ie: Samples A, B and C) were tested with the thermocouples 38 attached instead to the coating layer of Samples A and B and the samples placed in the test apparatus such that the light sources irradiated the surface of Samples A and B coated with a thin layer of black paint. The increase in temperature measured by the thermocouples 38 in this further experiment is depicted in FIG. 4a. The results indicate that the temperature of the unexposed surface of Sample A reached a maximum of approximately 74° C. whereas the temperature of the unexposed surface of Sample B and Sample C each reached a maximum temperature of approximately 66° C.

The results depicted in FIGS. 4 and 4a demonstrate that the magnitude of heat transfer through the sample to which a coating containing cellulose particles has been applied is dependent on which surface of the sample is irradiated by the thermal radiation provided by the light sources 37. When the coated surface of Samples A and B was irradiated by the thermal radiation, the heat transfer through Sample A was less than Samples B and C. When the surface of Samples A and B coated with a thin layer of black paint was irradiated by the thermal radiation, the heat transfer through Sample A was higher than the heat transfer through Samples B and C.

Similar results were observed by the inventors in a further series of experiments testing two steel plates, one coated on one 200×300 mm surface with a non-white paint coating formed from a liquid paint based composition having dispersed therethrough cellulose particles (at 55 g/L, 50 μm average diameter) (Sample D) and one coated on one 200×300 mm surface with a paint coating formed from the same paint based composition but not containing cellulose particles (Sample E). The colour of the paint was a brown/green colour known in the trade as "environmental green". As indicated above, the other 200×300 mm surface of both samples was coated with a thin layer of conventional black paint. The results of the experiment when heat was applied to the surface of Samples D and B coated with a thin layer of black paint are depicted in FIG. 4b. These results again indicate that Sample D having the coating incorporating the cellulose particles exhibited a higher degree of heat transfer than Sample E and Sample C when heat was applied to the surface of Samples D and E coated with a thin layer of black paint. The results depicted in FIG. 4c for when the coated surface of each of Sample D and Sample E were irradiated reveal, in contrast, that the heat transfer was lower for Sample D than Sample E or Sample C.

In a further experiment, 0.1 g/L microcrystalline cellulose particles (Avicel 1.02330.0000 produced by Merck Australia Pty Ltd) was added to a white water-based acrylic paint coating composition, and dispersed under high shear breaking the cellulose particles into-particles having an average dry particle size of less than 10 μm. A sample having a coating formed from this coating composition (Sample F) was compared with another sample having a coating formed from the same paint coating composition but without the addition of cellulose particles (Sample G). The results of the experiment when heat was applied to the coated surface of Sample F and Sample G is depicted in FIG. 4d. The results depicted in FIG. 4d demonstrate that the heat transfer for Sample F was lower than that for Sample G.

The performance of Sample A was the benchmark used by the present inventors against which samples having coatings formed from coating compositions according to the present invention were compared.

Using the same paint base (water based acrylic) as Sample A a series of coating compositions according to the present invention incorporating the proportions of microcrystalline cellulose particles indicated in Table 1 were prepared. The coating compositions were prepared by mixing microcrystalline cellulose particles (Avicel 1.02330.0000 produced by Merck Australia Pty Ltd) with the paint base, and dispersing the cellulose particles under high shear breaking the cellulose particles into particles having an average dry particle size of less than 10 μm. Samples having a coating of the dry thickness indicated in Table 1 were prepared using these coating compositions (the Test Samples), and the Test Samples were tested together with Samples A and C as described above, with the heat applied to the surface of the Test Sample having the coating and the surface of Sample A having the coating. The temperatures measured by the thermocouples attached to some of these samples in the test apparatus 30 are depicted in FIGS. 5-10.

The relative inefficiency of these samples in comparison to the reference sample (Sample A) was calculated as the difference between the maximum temperature reached for the sample and that reached for Sample A divided by the maximum temperature reached for Sample C expressed as a percentage. A negative number means the sample was more efficient in retarding the transfer of heat through the sample than Sample A. The relative inefficiency of the samples set out in Table 1.

TABLE 1

| Sample Code | FIG. | Thickness of coating (μm) | Mix ratio (g/L) | Relative inefficiency (%) |
|---|---|---|---|---|
| 964 |   | 110 | 10 | 1.525 |
| 965 | 5 | 110 | 9 | −1.571 |
| 966 |   | 110 | 8 | −2.067 |
| 967 |   | 110 | 7 | −1.246 |
| 968 |   | 110 | 6 | 0.363 |
| 969 | 6 | 110 | 5 | −2.615 |
| 970 |   | 110 | 4 | −1.178 |
| 971 |   | 110 | 3 | −3.026 |
| 972 |   | 110 | 2 | −0.015 |
| 973 |   | 110 | 1 | −2.531 |
| 974 |   | 90 | 0.8 | 4.517 |
| 975 | 7 | 90 | 0.6 | −2.384 |
| 976 |   | 90 | 0.4 | −0.471 |
| 986 |   | 110 | 0.2 | 0.067 |
| 987 |   | 110 | 0.08 | 7.35 |
| 988 | 8 | 110 | 0.06 | −1.34 |
| 989 |   | 110 | 0.04 | 2.00 |
| 990 |   | 110 | 0.02 | 3.696 |
| 1000 |   | 110 | 0.008 | −0.928 |
| 1001 | 9 | 110 | 0.006 | −3.334 |
| 1002 |   | 110 | 0.004 | −1.908 |
| 1003 |   | 110 | 0.002 | 3.422 |
| 1032 |   | 110 | 0.0008 | −4.114 |
| 1033 | 10 | 110 | 0.0006 | −4.604 |
| 1034 |   | 110 | 0.0004 | −6.796 |
| 1035 |   | 110 | 0.0002 | −5.67 |

The results given above indicate that by using microcrystalline cellulose particles, the ability of the paint coating to maintain the lower surface of the substrate at a temperature significantly lower than that of a substrate having a similar coating containing no cellulose particles was maintained as the mix ratio was decreased over orders of magnitude. This finding is significant as it means that the quantity of cellulose particles required to achieve the desirable thermal properties of the coating is significantly lower than hitherto thought possible. By being able to add lower proportions of cellulose particles with a smaller particle size, it is also possible to develop paints having the desirable thermal properties for use in areas such as automotive paints where very fine particles sizes are required if the paint is to match the aesthetic qualities of paints presently used for this application.

Experiments have also been undertaken to determine the effect of varying the produced film thickness of coatings at a selected mix ratio. In all of these experiments the cellulose particles used in the coating composition were microcrystalline cellulose particles (Avicel 1.02330.0000 produced by Merck Australia Pty Ltd), and these particles were added to a paint coating composition in the mix ratio referred to in Table 2 and dispersed under high shear breaking the cellulose particles into cellulose particles having an average dry particle size of less than 10 μm. Samples having a coating of the dry thickness specified in Table 2 were prepared using these coating compositions (the Test Samples), and the Test Samples tested with Samples A and C as described above, with the heat applied to the surface of the Test Sample having the coating and the surface of Sample A having the coating. The relative inefficiency of these samples in comparison to the reference sample (Sample A) was then calculated as described above. The results are set out in Table 2.

TABLE 2

| Sample Code | Thickness of coating (μm) | Mix ratio (g/L) | Relative inefficiency (%) |
|---|---|---|---|
| 974 | 90 | 0.8 | 4.52 |
| 975 | 90 | 0.6 | −2.38 |
| 976 | 90 | 0.4 | −0.47 |
| 978 | 80 | 1 | 7.12 |
| 979 | 70 | 1 | 5.94 |
| 980 | 60 | 1 | 8.99 |
| 981 | 50 | 1 | 13.51 |
| 982 | 40 | 1 | 20.15 |
| 983 | 30 | 1 | 23.21 |
| 984 | 20 | 1 | 34.24 |

The results in the above table not surprisingly demonstrate that as the film thickness decreases the inefficiency of the coating worsens relative to the properties of the reference sample (Sample A) The results do, however, indicate by extrapolation that at a thickness of about 95 μm the efficiency of a sample having a coating containing 1 g/L of microcrystalline particles having an average particle size of less than 10 μm is the same as the reference sample (Sample A) containing 55 g/L of 50 μm cellulose particles in a layer 270 μm thick.

A series of experiments were conducted to find out the effect of the use of the microcrystalline cellulose in various other coating compositions. In all of the following experiments the microcrystalline particles used were obtained from the product Avicel 1.02330.0000 produced by Merck Australia Pty Ltd. In all the experiments, except the experiment involving the window film coating, the cellulose particles were added to the other coating composition ingredients and dispersed under high shear.

Figure 11:
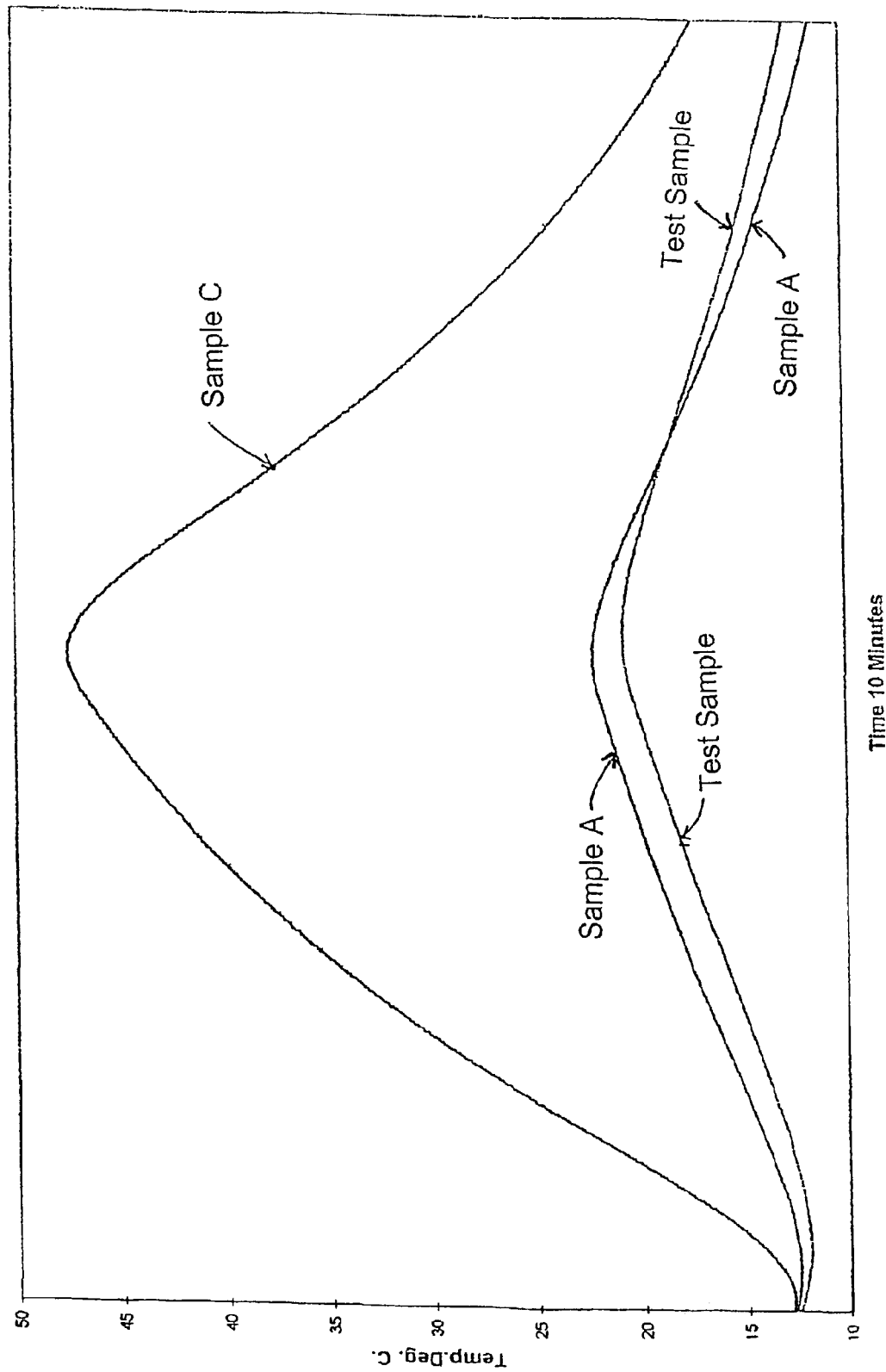

Using a two-pack polyurethane coating (Interthane 80), two samples with coatings were prepared (the Test Samples). In one Test Sample, a coating containing 0.1 g/L microcrystalline cellulose particles was formed on one 200×300 mm surface of a steel plate. In the other Test Sample, a coating containing no cellulose particles was formed on one 200×300 mm surface of a steel plate. As indicated above, the other 200×300 mm surface of the steel plates was coated with a thin layer of conventional black paint. Each of the Test Samples was tested together with Sample A and Sample C as described above with heat applied to the surface of the Test Sample having the coating and the surface of Sample A having the coating. FIG. 11 shows the results for the Test Sample with a coating containing 0.1 g/L of microcrystalline cellulose particles compared with the standard reference sample (Sample A) and the all black plate (Sample C). FIG. 12 shows the results for the Test Sample with the coating containing no microcrystalline cellulose particles compared with the standard reference sample (Sample A) and the all black plate (Sample C). It can be seen that the presence of the microcrystalline cellulose in the two pack polyurethane coating significantly reduces the temperature on the non-irradiated side of the sample with that coating compared to the sample with the coating containing no microcrystalline cellulose particles.

In another experiment three samples were prepared by applying a coil coating (plastisol type coil coating) to one 200×300 mm surface of 3 steel plates. In one sample (Sample 1), the coil coating had dispersed therethrough 1 g/L microcellulose particles. In the second sample (Sample 2), the coil coating had dispersed therethrough 15 g/L cellulose particles. In the third sample (Sample 3), the coil coating did not contain cellulose particles. The three samples were tested as described above with heat applied to the surfaces of the samples having the coil coatings, and the results are shown in FIG. 13. It can be seen in FIG. 13 that the presence of 1 g/L of microcrystalline cellulose dispersed in the coil coating significantly reduces the temperature on the non-radiated side of the samples compared to the coil coating without microcrystalline cellulose and the coil coating with 15 g/L of microcrystalline cellulose.

It can be shown that the dispersion of cellulose particles having an average dry particle size of less than 10 μm in all types of paint coating compositions will have a thermal effect in coatings formed from the coating compositions.

Using water based ink, two samples with ink coatings were prepared (the Test Samples) and tested in the test apparatus as described above with heat applied to the surface of the samples having the coating. FIG. 14 shows the results of the Test Sample with a water based ink coating formed from water based ink with 1 g/L of microcrystalline cellulose particles compared with the standard reference sample (Sample A). FIG. 15 shows the results of the Test Sample with a water based ink coating formed from a water based ink with no microcrystalline cellulose particles compared with the standard reference sample (Sample A). It can be seen that the presence of the microcrystalline cellulose in the water based ink significantly reduces the temperature on the non-radiated side of the sample with the coating formed from that ink compared to the sample with the coating formed from the water based ink without microcrystalline cellulose.

A test was also conducted with a window film coating. Microcrystalline cellulose particles (0.1 g/L) having an average dry particle size of less than 10 μm were dispersed evenly into a window film material during manufacture before application to a glass sheet (Sample 1). A similar glass sheet was also prepared with the same thickness of a similar window film containing no microcrystalline cellulose particles (Sample 2). These two glass samples were tested in the test apparatus in a similar manner to that described above with the heat applied to the surface of the glass sheets having the window film coating, and the results are shown in FIG. 16. It can be seen in FIG. 16 that the inclusion of the microcrystalline cellulose particles in the window film material has a thermal effect.

A test was also conducted with fire fighting foam. 1 g/L of microcrystalline cellulose particles (Avicel 1.02330.0000 produced by Merck Australia Pty Ltd) were dispersed evenly into a defined quantity of fire fighting foam under high shear. Two steel plates were prepared with dams creating a 10 mm high wall surrounding an area 75 mm square at the center of each plate. One sample (Sample 1) had foam coating with 1 g/L of microcrystalline cellulose evenly dispersed in the foam and the second sample (Sample 2) had a foam coating with no cellulose particles added. The same quantity of foam was added within each dam. The two samples were tested in the test apparatus in a similar manner to that described above, with the heat applied to the surface of the sample having the foam coating, together with a sample having no foam coating (Sample 3). The results are shown in FIG. 17. FIG. 17 shows that the presence of the cellulose particles maintained the non-radiated side of the sample with the foam coating containing cellulose particles at a lower temperature throughout the 40 minute test. The elbow in the curve occurs when the foam is evaporating to the point with no more liquid present. The graph shows that the lower surface of the sample with the foam coating containing microcrystalline cellulose stays at a much lower temperature even after all the liquid has evaporated. The graph shows that it takes approximately twice as long for that sample to reach the same temperature as the sample with the foam coating with no microcrystalline cellulose present. This time difference is very significant for fire fighting as the time taken to reach particular temperatures is critical to fire control and minimizing damage.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that a reference herein to a prior art document does not constitute an admission that the document forms part of the common general knowledge in the art in Australia or any other country.

The claims defining the invention are as follows:

1. A thermal transmission altering coating composition comprising (i) a supporting medium, and (ii) a plurality of cellulose particles, having an average dry particle size of less than 10 μm, dispersed in the supporting medium in an amount of 0.0002 g/L to about 0.1 g/L.

2. A coating composition according to claim 1 wherein the supporting medium is a liquid or foam.

3. A coating composition according to claim 1 wherein the supporting medium is a paint composition.

4. A coating composition according to claim 1 wherein the supporting medium is a film material adapted to be applied to a surface to form a coating on the surface.

5. A coating composition according to claim 4 wherein the coating composition is a plastic film.

6. A coating composition according to claim 1 wherein the supporting medium is an adhesive.

7. A coating formed from a coating composition according to any one of claims 1, 2, 3, 4, 5 or 6.

8. An article or structure wherein at least one surface of the article or structure has applied to it a coating formed from a coating composition according to any one of claims 1, 2, 3, 4, 5 or 6.

9. An article or structure wherein at least one surface of the article or structure has applied to it a multiple layer coating with one or more layers of the coating being formed from a coating composition according to any one of claims 1, 2, 3, 4, 5 or 6.

\* \* \* \* \*